United States Patent
Uchida et al.

(10) Patent No.: US 12,461,488 B2
(45) Date of Patent: Nov. 4, 2025

(54) OPTICAL IDENTIFIER AND PRINTED MATTER

(71) Applicant: TOPPAN INC., Tokyo (JP)

(72) Inventors: Satoshi Uchida, Tokyo (JP); Akihito Kagotani, Tokyo (JP)

(73) Assignee: TOPPAN INC., Tokyo (JP)

( * ) Notice: Subject to any disclaimer, the term of this patent is extended or adjusted under 35 U.S.C. 154(b) by 589 days.

(21) Appl. No.: 17/879,005

(22) Filed: Aug. 2, 2022

(65) Prior Publication Data

US 2022/0382214 A1 Dec. 1, 2022

Related U.S. Application Data

(63) Continuation of application No. PCT/JP2021/004324, filed on Feb. 5, 2021.

(30) Foreign Application Priority Data

Feb. 7, 2020 (JP) .................................. 2020-019313

(51) Int. Cl.
  *G03H 1/26* (2006.01)
  *B42D 25/324* (2014.01)
  (Continued)

(52) U.S. Cl.
  CPC ......... *G03H 1/2645* (2013.01); *B42D 25/324* (2014.10); *B42D 25/328* (2014.10); *G02B 27/4205* (2013.01); *G03H 2001/2675* (2013.01)

(58) Field of Classification Search
  CPC ......... G03H 1/2645; G03H 2001/2675; B42D 25/324; B42D 25/328; G02B 27/4205
  (Continued)

(56) References Cited

U.S. PATENT DOCUMENTS

2010/0080938 A1  4/2010  Toda et al.
2015/0192897 A1  7/2015  Schilling et al.
(Continued)

FOREIGN PATENT DOCUMENTS

DE  10 2012 105 571 A1  1/2014
JP      3778966 B2      2/1997
(Continued)

OTHER PUBLICATIONS

International Searching Authority, "International Search Report," issued in connection with International Patent Application No. PCT/JP2021/004324, dated Apr. 13, 2021, 7 pages.
(Continued)

*Primary Examiner* — William Choi
(74) *Attorney, Agent, or Firm* — Foley & Lardner LLP

(57) ABSTRACT

An optical identifier including a recording surface, a plurality of deflection cells each of which has recorded thereon a range in which light to be diffracted is deflected, at least one spatial phase modulator which fills a space between the deflection cells on the recording surface, and a deposition layer which covers part or all of the recording surface. The deflection cells has a spatial frequency expressed in a form of a relief structure and are discretely formed on the recording surface at regular intervals away from each other. A variable color image is recorded by pixels defined by the deflection cells. The spatial phase modulator has thereon a distribution of phase differences recorded in a form of heights of the relief structure. The spatial phase modulator modulates a phase of light outputted from a point light source and displays a reproduced image.

3 Claims, 15 Drawing Sheets

(51) Int. Cl.
*B42D 25/328* (2014.01)
*G02B 27/42* (2006.01)

(58) Field of Classification Search
USPC .......................................................... 359/291
See application file for complete search history.

(56) References Cited

U.S. PATENT DOCUMENTS

| 2016/0121641 | A1 | 5/2016 | Toda et al. |
| 2019/0049636 | A1 | 2/2019 | Uchida |

FOREIGN PATENT DOCUMENTS

| JP | 2002-090548 | A | | 3/2002 | | |
| JP | 2002-278433 | A | | 9/2002 | | |
| JP | 2003-015510 | A | | 1/2003 | | |
| JP | 2010-072384 | A | | 4/2010 | | |
| JP | 2017037273 | A | * | 2/2017 | ........... | B42D 25/328 |
| JP | 2017-129802 | A | | 7/2017 | | |
| KR | 10-2009-0130329 | A | | 12/2009 | | |
| KR | 10-2009115 | B1 | * | 10/2019 | ........... | B42D 25/351 |
| WO | WO-2017/183718 | A1 | | 10/2017 | | |

OTHER PUBLICATIONS

International Searching Authority, "Written Opinion," issued in connection with International Patent Application No. JP2021/004324, dated Apr. 13, 2021, 4 pages.
Office Action issued in corresponding Korean Patent Application No. 10-2022-7030160 dated Jul. 23, 2024 (11 pages).
European Extended Search Report issued in corresponding European Patent Application No. 21750648.4 dated Jul. 5, 2023 (8 pages).

* cited by examiner

CELL DIMENSION   CELL DIMENSION

FIG.17
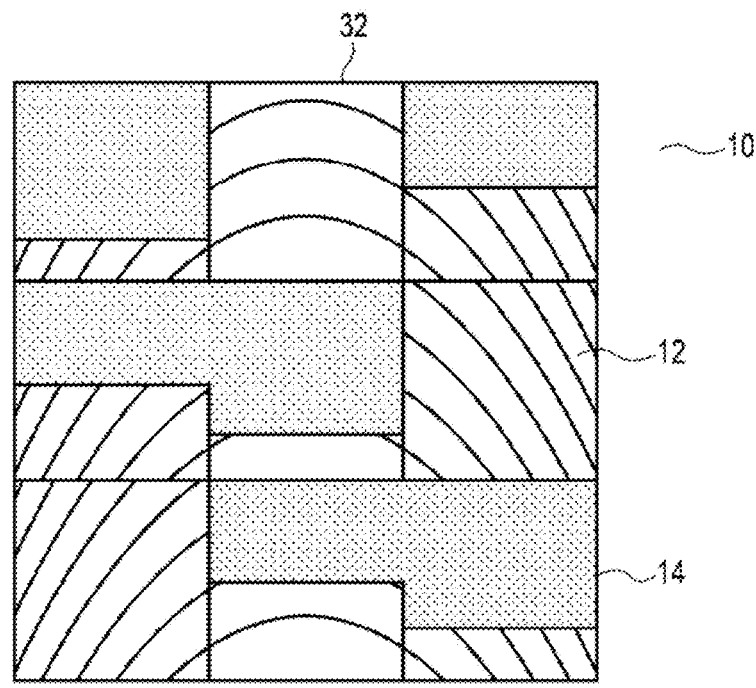
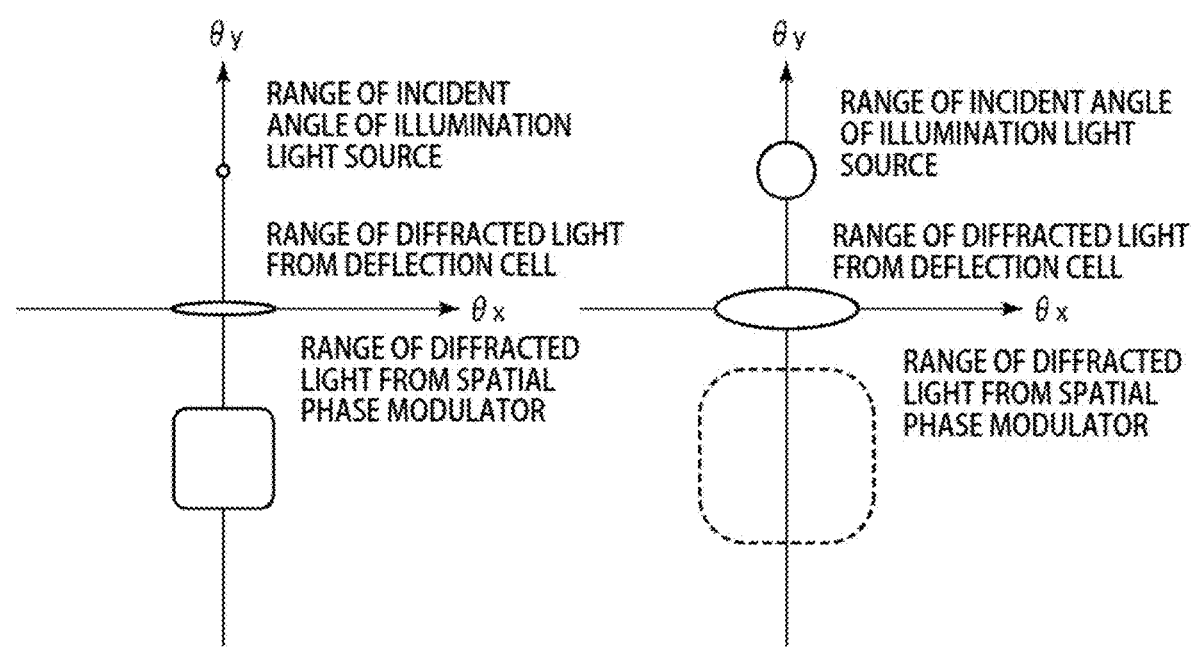
FIG. 18(a)   FIG. 18(b)

OPTICAL IDENTIFIER AND PRINTED
MATTER

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2021/004324, filed on Feb. 5, 2021, which in turn claims the benefit of JP 2020-019313, filed Feb. 7, 2020 the disclosures of all which are incorporated herein by reference in its entirety.

TECHNICAL FIELD

The present invention relates to an optical identifier and to printed matter provided with a display technique that provides an anti-counterfeiting effect.

BACKGROUND

Certificated securities, cards, and certificates are normally provided with a display having a visual effect that is different from that of ordinary printed matter so that they are difficult to counterfeit.

An example of a display having a visual effect that is different from that of ordinary printed matter is a display that provides a variable color image. Such a display uses the fact that, as described in WO2017/183718, light incident on a diffraction grating is dispersed according to the spatial frequency of the diffraction grating, and arbitrarily combines a plurality of diffraction gratings having different spatial frequencies. For example, as a method of displaying an arbitrary color, in a display including diffraction gratings having spatial frequencies corresponding to R (red), G (green), and B (blue), light is dispersed by each diffraction grating, and the fact that the light to be diffracted has a different angle for each wavelength is utilized such that, when the display is observed from an arbitrary angle, the observer identifies a specific color due to the mixing of specific wavelengths emerging from each of the R, G, and B diffraction gratings. Therefore, by arranging the R, G, and B diffraction gratings in an appropriate manner, it is possible to display an appropriate variable color image with the diffraction gratings.

As another display that provides a variable color image, a display having a stereoscopically viewable color image is described in JP 3778966 B2. Here, the image is displayed using a diffraction grating as a pixel, and parallax is created and stereoscopic vision is realized by setting the direction in which the primary diffraction light emerges from the diffraction grating cell. Parallax images corresponding to different directions can be observed from each direction, and a three-dimensional image is expressed due to binocular disparity. The wavelength of the diffraction light determines the observed color.

On the other hand, as a display that combines a diffraction grating and a computer hologram, JP 2017-37273 B describes an invention that combines a diffraction grating and a computer hologram, and displays an optical image and a diffraction grating design in a hologram forming area composed of the diffraction grating and the computer hologram, and JP 2017-129802 A describes an invention in which a diffraction grating and a computer hologram both exist and reproduce an optical image by observation from a specific direction.

As described above, the conventional techniques assume an ordinary light source, and are displays that display a variable color image formed using diffraction light to an observer at a specific observation angle using a diffraction grating. Furthermore, there are also displays that provide a three-dimensional color image when a white point light source is irradiated thereto.

SUMMARY OF THE INVENTION

However, the variable color image described in WO2017/183718 is already known, and has a poor anti-counterfeiting effect. Furthermore, the stereoscopic display described in JP 3778966 B is already known. In addition, in the combination of a diffraction grating and a computer hologram described in JP 2017-37273 A and JP 2017-129802 A, a complicated pattern can be switched with good visibility according to the presence or absence of a point light source, but the effect is poor in terms of displaying a color image.

The present invention has been made in view of the above circumstances, and has an object of providing an optical identifier and a printed matter having improved anti-counterfeiting properties and distinguishing properties.

To achieve the above object, embodiments of the present invention provide the following means.

A first invention is an optical identifier including a recording surface, a plurality of deflection cells each of which has recorded thereon a range in which light to be diffracted is deflected, at least one spatial phase modulator which fills a space between the deflection cells on the recording surface, and a deposition layer which covers part or all of the recording surface. The deflection cells has a spatial frequency expressed in a form of a relief structure. The deflection cells are discretely formed on the recording surface at regular intervals away from each other. A variable color image is recorded by pixels defined by the deflection cells. The spatial phase modulator has thereon a distribution of phase differences recorded in a form of heights of the relief structure. The spatial phase modulator modulates a phase of light outputted from a point light source and displays a reproduced image. The deflection cells diffract diffused light and deflect the diffused light by directional scattering, the deflection cells displaying the variable color image recorded in a form of heights of the relief structure.

A second invention is the optical identifier of the first invention, in which each of the deflection cells is composed of a diffraction grating.

A third invention is an optical identifier according to the first or second invention, in which the spatial phase modulator displays a color reproduced image by being configured by a plurality of convex portions, or a plurality of concave portions, and a flat portion. The plurality of convex portions is provided on an upper surface which is substantially parallel to a display surface of a release layer. The plurality of concave portions is provided on a bottom surface which is substantially parallel to the display surface. The flat portion is substantially parallel to the display surface.

A fourth invention is an optical identifier according to any one of the first to third inventions including a plurality of spatial phase modulators each of which is the spatial phase modulator, in which a plurality of convex portions and a plurality of concave portions constituting the plurality of spatial phase modulators have different depths to each other.

A fifth invention is an optical identifier according to any one of the first to fourth inventions, including a deflection cell in which each diffraction grating constituting the deflection cell has a different spatial frequency to each other.

A sixth invention is an optical identifier according to any one of the first to fifth inventions, including deflection cells having different areas to each other.

A seventh invention is an optical identifier according to any one of the fifth to sixth inventions, in which a ratio of the diffraction grating constituting each of the deflection cells is standardized, according to the variable color image, to a constant value smaller than 1, and an area of the spatial phase modulator provided in each of the deflection cells is constant in each cell in which the spatial phase modulator is provided.

An eighth invention is an optical identifier according to any one of the first to seventh inventions, in which each of the deflection cells and a cell provided with the spatial phase modulator are independent of each other.

A ninth invention is an optical identifier according to any one of the first to eighth inventions, in which a dimension of each of the deflection cells is a multiple or a divisor of a dimension of a cell provided with the spatial phase modulator.

A tenth invention is an optical identifier according to any one of the second to ninth inventions, in which a spatial phase modulator area includes a plurality of spatial phase modulators each of which is the spatial phase modulator. The spatial phase modulator area displays the reproduced image which surrounds a pixel including a plurality of deflection cells.

An eleventh invention is an optical identifier according to any one of the first to tenth inventions, in which the spatial phase modulator is configured as a Fourier transform hologram that displays a reproduced image in a far field.

A twelfth invention is an optical identifier according to any one of the first to tenth inventions, in which the spatial phase modulator is configured as a Fresnel conversion hologram that displays a virtual image, a real image, or a reproduced image produced by the virtual image and the real image by emission from a focal point and focusing of light at a focal point.

A thirteenth invention is an optical identifier according to any one of the first to twelfth inventions, in which the reproduced image is mechanically readable.

A fourteenth invention is an optical identifier according to the third or fourth inventions, in which a depth of the convex portion or the concave portion is 0.1 μm or more and 1 μm or less.

A fifteenth invention is a printed matter to which the optical identifier of any one of the first to the fourteenth inventions is attached.

Advantageous Effects of the Invention

According to the first invention, by providing on the recording surface the deflection cells and the spatial phase modulator, a variable color image is obtained when observed under illumination of diffused light. Further, a reproduced image which is not perceived and is latent when observed under illumination with diffused light is observed under parallel illumination by a point light source, and therefore, an optical identifier having a high anti-counterfeiting effect and high distinguishability can be realized. The deflection cells display a brilliant image under diffused light. The spatial phase modulator displays a reproduced image by parallel illumination by a point light source.

The brilliant variable color image produced by the deflection cell observed under diffused light can be easily perceived when the variable color image is observed at a specific observation angle. However, under a point light source, the image is not easily perceived because the specific observation angle is limited as compared with the observation under diffused light. On the other hand, the reproduced image from the spatial phase modulator is clearly reproduced and easily perceived under parallel illumination by a point light source. Under diffused light, the reproduced image from the spatial phase modulator is not easily perceived because the reproduced image is not focused at the reconstruction points and is blurred. The diffused light may be light from a planar light source, or indirect illumination light in which light from a light source is diffused by a diffuser. An example of a planar light source is a ceiling light. Examples of point light sources include spotlights and flashlights. A point light source may be configured by an LED and a collimator. A collimator may be configured by a convex lens, a parabolic reflector, or both. Here, diffused light refers to light which is incident on a certain point of the optical identifier from a certain incident angle range. The half width of the angle of incidence of this scattered light may be 5° to 45°. Furthermore, parallel light refers to light which is incident on a certain point of the optical identifier from a certain incident angle or less. The half width of the angle of incidence of this parallel light may be 5° or less.

Moreover, when the deflection cells are configured by a diffraction grating, the variable color image produced by the deflection cells can display colors by mixing the colors of diffraction light having different wavelengths under the diffused light. On the other hand, when observed from an observation angle different from the designed angle under a point light source, the variable color image is not displayed with the designed color development. Therefore, under a point light source, the visual effect of the reproduced image from the spatial phase modulator is not easily impaired.

In the optical identifier, it is possible to perform two-step verification by observing the brilliant image under diffused light as a first authentication, and observing the reproduced image under a point light source as a second authentication. The information of the second authentication is not visually recognized under a normal light source, and the information is visually recognized and accessible by illuminating light from a point light source, which provides excellent confidentiality.

According to the second invention, the diffraction gratings of the deflection cells display a variable color image formed by the diffraction grating in a specific direction. Therefore, because the image formed by the deflection cell and the reproduced image formed by the phase modulator are displayed in different directions to each other, and the brilliant reproduced image overlaps with part of the variable color image in the height direction, a visual effect in which the reproduced image of a latent image appears on the variable color image, which cannot be obtained with a simple latent image and is particular to the embodiment of the present invention, can be obtained. Furthermore, because the displayed image is a reproduced image that overlaps the variable color image in the height direction, which cannot be obtained using a variable color image and a latent image produced by printing, the optical identifier has a high anti-counterfeiting effect.

According to the third invention, because the spatial phase modulator is configured as a computer hologram and functions as a color modulation element that changes the wavelength distribution of the emerging light relative to the incident light, and are configured by a plurality of convex portions, or a plurality of concave portions, and a flat portion, it is possible to obtain an optical identifier that displays a reproduced image in clear color. The plurality of convex portions is provided on the upper surface which is substantially parallel to the display surface of the release layer. The plurality of concave portions is provided on the bottom surface which is substantially parallel to the display surface. The flat portion is substantially parallel to the base material surface.

According to the fourth invention, as a result of the plurality of spatial phase modulators each being configured by a plurality of convex portions and a plurality of concave portions in which the convex portions and concave portions have different depths, any coloration within the color range determined by the depths of the convex portions and the concave portions can be obtained, and it is possible to obtain an optical identifier capable of displaying a reproduced image of any color.

According to the fifth invention, the optical element is a diffraction grating composed of a plurality of cells having different spatial frequencies, and by diffracting light having different wavelengths according to the spatial frequency, each cell can exhibit a different coloration, and further, by mixing the colorations, it is possible to obtain an optical identifier that realizes a variable color image of any coloration.

Furthermore, when a plurality of color display cells with different spatial frequencies are provided, and these cells are made to exist with a cell in which the spatial phase modulator is provided, in order to make both the variable color image and the reproduced image clear and bright, the technical difficulty of properly arranging the cells of both the diffraction grating and spatial phase modulator elements increases, and the cost of counterfeiting also increases. As a result, the anti-counterfeiting effect is increased.

In the case of a cell of a variable color image, for example, three cells representing R, G, and B configure a single pixel, and in the case of a color reproduced image, a single cell configures a single pixel when an arbitrary single unevenness depth is used (it is not limited to this when an arbitrary plurality of uneven portions is used), and therefore, because the ratio of cells in the variable color image and the color reproduced image is not simply one-to-one, it is necessary to create the data in consideration of this point when creating drawing data, which increases the technical difficulty and increases the anti-counterfeiting effect.

According to the sixth invention, by realizing a gradation image using the difference in the areas of the plurality of deflection cells, it is possible to obtain an optical film capable of expressing a delicate color gradation design. Furthermore, for the purposes of gradation expression, because the occupancy of the diffraction grating in each of the R, G, and B deflection cells is different, when the spatial phase modulator is provided in the deflection cell, the ratio of the spatial phase modulators and the diffraction gratings is different in each deflection cell in order to obtain a clear three-dimensional color image. Therefore, in a design where the spatial phase modulator is provided in the deflection cell, complicated processing is required such as calculation of the area in which the spatial phase modulator is to be provided with standardization based on the maximum area occupancy of a deflection cell for the variable color image, which makes counterfeiting difficult and increases the anti-counterfeiting effect.

According to the seventh invention, the ratio of each of the deflection cells occupied by the diffraction grating in a cell provided with the diffraction grating is standardized, according to the variable color image, to a constant value smaller than 1, and because the ratio of the spatial phase modulators provided in each of the deflection cells is constant in each cell, it can exist inside each of the deflection cells provided with the diffraction grating, which enables a design in which the spatial phase modulator is provided to be simplified.

According to the eighth invention, the deflection cell provided with the diffraction grating and the cell provided with the spatial phase modulator are independent of each other, and it is possible to obtain an optical identifier that can realize complicated combinations relatively easily without disturbing the balance of the variable color image and the reproduced image as images, and without requiring a complicated cell arrangement design.

According to the ninth invention, because the dimension of each of the deflection cells provided with the diffraction grating is a multiple or a divisor of the dimension of the cell provided with the spatial phase modulator, it is possible to obtain an optical identifier that can effectively and efficiently utilize the area in which the structure is two-dimensionally provided.

According to the tenth invention, an optical identifier having an excellent design can be obtained by surrounding the pixel displaying the variable color image with a spatial phase modulator area for displaying the reproduced image.

According to the eleventh invention, because the spatial phase modulator is configured as a Fourier transform hologram, the obtained reproduced image can be obtained at a position separated in the height direction from the variable color image observed under an ordinary light source. Further, it is possible to obtain an optical identifier representing a small amount of data as a computer hologram, and which has a short calculation time and is easily prepared.

According to the twelfth invention, because the spatial phase modulator is configured as a Fresnel transform hologram, the obtained reproduced image can be obtained at a position separated in the height direction from the variable color image observed under an ordinary light source, and it is possible to obtain an optical identifier from which a reproduced image can be obtained after performing a calculation at a closer position in the depth direction to the variable color image than in the case of a Fourier transform hologram.

According to the thirteenth invention, because the reproduced optical image is mechanically readable, the optical image can be used as an information source, and an optical identifier having a high anti-counterfeiting effect can be obtained. In addition, even when the display is attached to a curved object such as a rolled object, if an optical image is provided in consideration of the curvature in advance, reading problems caused by the curvature of the optical image to be mechanically read can be suppressed.

According to the fourteenth invention, as a result of the depth of the convex portion or the concave portion being 0.1 μm or more and 1 μm or less, an optical identifier having the desired reproduced image can be easily obtained.

According to the fifteenth invention, it is possible to obtain a printed matter to which an optical identifier of any one of the first to the fourteenth inventions is attached.

BRIEF DESCRIPTION OF THE DRAWINGS

FIG. 17 is a plan view showing an example of an optical identifier which includes cells in which a deflection cell and a spatial phase modulator are mixed at an arbitrary ratio in addition to cells having only an arc-shaped deflection cell.

FIGS. 18(A) and 18(B) are diagrams for illustrating a difference in a visual field range due to a difference in the light source of a deflection cell.

DETAILED DESCRIPTION

Figure 1A:
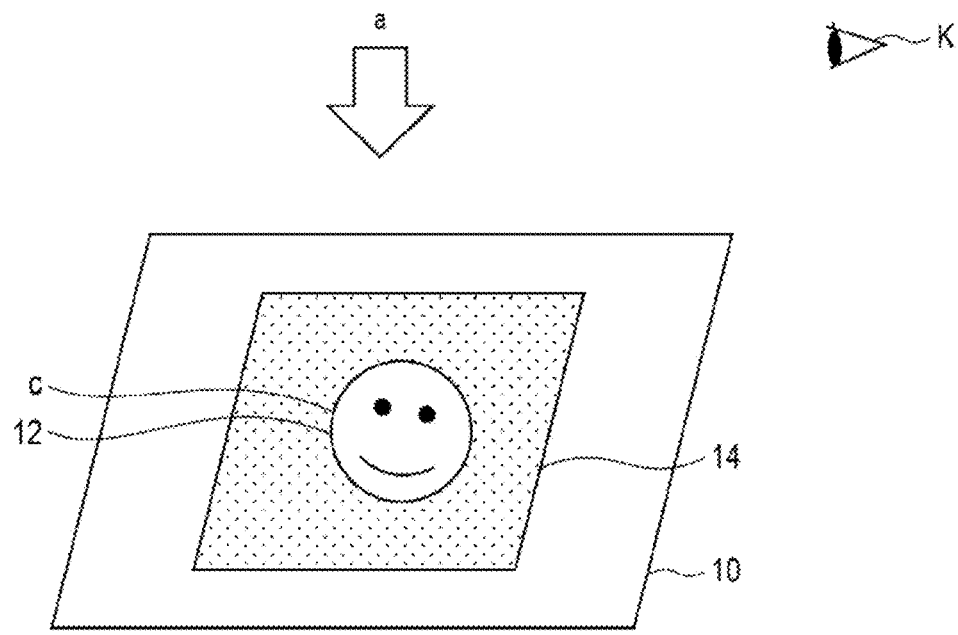
FIGS. 1(A) and 1(B) are explanatory diagrams schematically showing an optical identifier according to an aspect of the present invention, and an image that can be seen when an observer observes the optical identifier (when the design of the variable color image and the design of the reproduced image are different).

Hereinafter, aspects of the present invention will be described in detail with reference to the drawings. Throughout all the drawings, components which have the same or similar functions are denoted by the same reference numerals, and duplicate description is omitted. Furthermore, the embodiments of the present invention are a group of embodiments based on a single unique invention. Moreover, each aspect of the present invention is an aspect of the group of embodiments, which are based on a single invention. The configurations described in the present invention may include the aspects of the present disclosure. The features of the present invention can be combined to form the configurations. Therefore, the features of the present invention, the configurations of the present invention, the aspects of the present disclosure, and the embodiments of the present invention can be combined, and the combinations may exhibit cooperative functions to enable synergistic effects to be obtained.

Summary of Optical Identifier, Observation Method, and Description of Effects

Figure 1B:
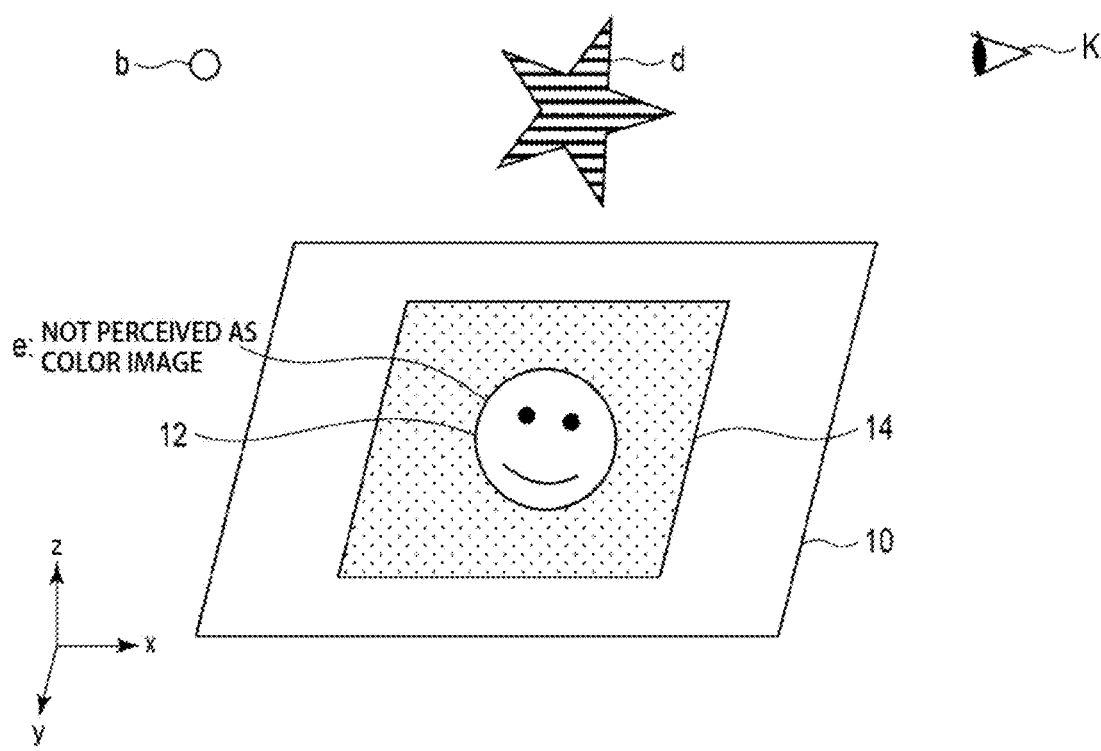

FIGS. 1(A) and 1(B) is an explanatory diagram schematically showing an optical identifier according to an aspect of the present invention, and an image that can be seen when an observer K observes the optical identifier. Specifically, in this case the design of the variable color image c and the design of the reproduced image d are different.

As shown in FIG. 1(A), the optical identifier 10 is capable of displaying a variable color image c when illuminated with an ordinary light source a, such as a fluorescent lamp or a ceiling light. The ordinary light source a is typically a white planar light source. The color temperature of the ordinary light source a may be from 2,600K to 7,100K. The ordinary light source a can illuminate the optical identifier 10 with white diffused light. On the other hand, FIG. 1(B) illustrates a latent image effect in which a reproduced image d, which is not perceived under the ordinary light source a, is three-dimensionally observed when illuminated by a point light source b. The reproduced image d may be in color or monochrome. That is, the variable color image c of the optical identifier 10 can be observed by illumination with white diffused light from the ordinary light source a. In other words, the optical identifier 10 displays the variable color image c when illuminated with white diffused light. On the other hand, the reproduced image d of the optical identifier 10 can be observed when illuminated with parallel light from a point light source. In other words, the optical identifier 10 displays the reproduced image d when illuminated with parallel light from a point light source.

The recording surface of the optical identifier 10 is provided with deflection cells that are provided with directional scattering and a diffraction grating 12 that realizes the effect of the variable color image c, and a spatial phase modulator area provided with a spatial phase modulator 14 that realizes the effects of the three-dimensional image d.

Because the spatial phase modulator area that displays the reproduced image d displays the reproduced image d that is not perceived under the ordinary light source a as a result of irradiation of the point light source b, only a person who is aware of the existence of the reproduced image can perceive the reproduced image d. Therefore, the reproduced image can be recorded as a hidden latent image. The reproduced image can be a 3D image. The reproduced image can be in color or monochrome. The reproduced image may be a collection of reconstruction points. A reproduced image formed of a collection of reconstruction points can readily have a high brightness. Furthermore, the existence of reproduction of the reproduced image d can be used for authenticity verification. Therefore, the reproduced image d, which is a latent image, can be one component of authenticity verification. Moreover, unlike the diffraction grating 12 that realizes the brilliant color image c, the spatial phase modulator 14 is configured as a computer hologram, and therefore, in order to realize the desired reproduced image d, it is necessary to calculate and determine the phase of the reproduced image recorded by the corresponding spatial phase modulator 14 corresponding to the reproduced image d. Consequently, since the production difficulty is higher than producing the diffraction grating 12 alone, the anti-counterfeiting effect is enhanced. The maximum value of the spatial frequency of the spatial phase modulator 14 may be 40 lines/mm or more and 400 lines/mm or less.

Because the reproduced image d is a computer hologram, a certain reconstruction point in the reproduced image does not have a one-to-one correspondence with a certain point on the spatial phase modulator area of the optical identifier 10. The reproduced image is displayed as a result of light from a non-localized area in the spatial phase modulator area. Therefore, it is not necessary to reproduce the image directly above the spatial phase modulator area, and the image can be reproduced on an area in which the spatial phase modulator 14 does not exist. Furthermore, the reproduced image can be directly above the diffraction grating 12. As a result of displaying the reproduced image on the diffraction grating 12, part or all of the variable color image c from the diffraction grating 12 is no longer perceived (e) under the point light source b, and the reproduced image d can be made to appear instead.

Figure 2A:
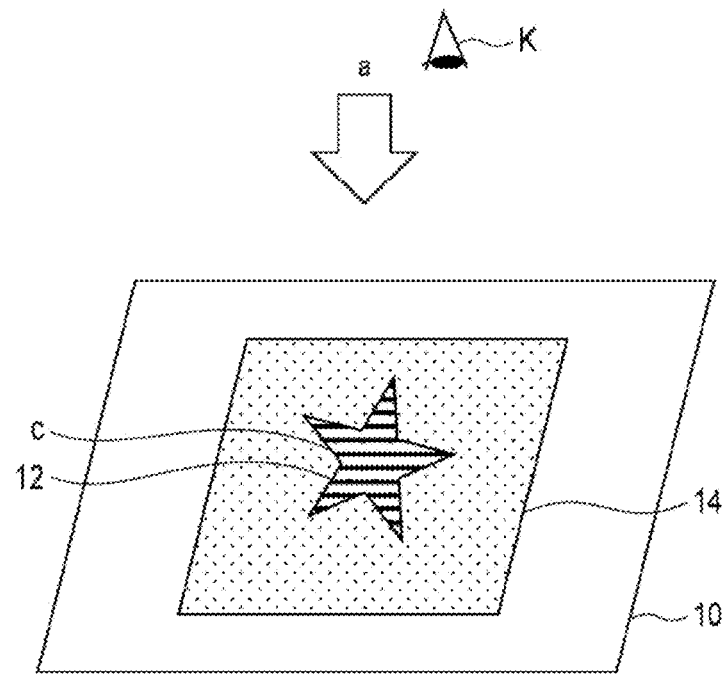
FIGS. 2(A) and 2(B) explanatory diagrams schematically showing an optical identifier according to an aspect of the present invention, and an image that can be seen when an observer observes the optical identifier (when the design of the variable color image and the design of the reproduced image are the same).
Figure 2B:
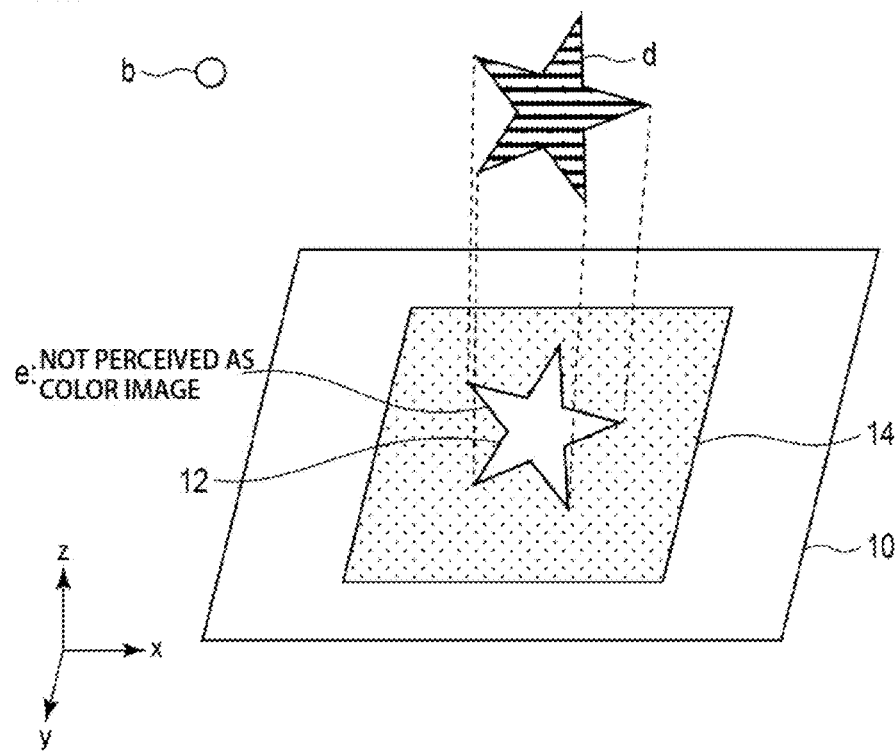

FIGS. 2(A) and 2(B) is an explanatory diagram schematically showing an optical identifier according to an aspect of the present invention, and a state of an image that can be seen when an observer K observes the optical identifier, especially when the design of the brilliant image c and the design of the reproduced image d are the same.

For example, as shown in FIGS. 2(A) and 2(B), a spatial phase modulator 14 is provided that causes the reproduced image d to appear so as to correspond to the design of the brilliant image c. In this case, at a specific observation angle, it is possible for the variable color image c to be observed under the ordinary light source a, and for the reproduced image d to be observed under the point light source b without the brilliant image c being observed (e). The brilliant image c and the reproduced image d can have the same design or different designs. In this way, an image changing effect can be realized depending on the presence or absence of irradiation of the point light source b. When the variable color image c and the reproduced image d have the same design, the variable color image c can be obtained under the ordinary light source a, and the variable color image c can be changed to the reproduced image d under the point light source b.

In this way, the optical identifier 10 can switch the displayed image according to a difference in the light source.

Figure 3A:
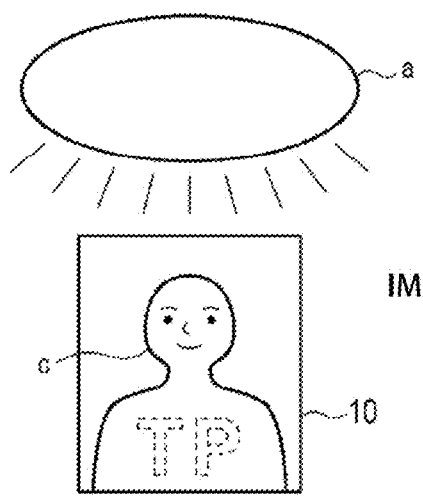
FIGS. 3(A) and 3(B) are diagrams showing another example of switching the display of an image.
Figure 3B:
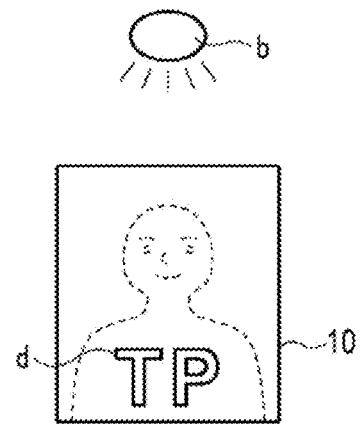

FIGS. 3(A) and 3(B) is a diagram showing another example of switching an image.

As shown in FIGS. 3(A) and 3(B), the face of a person can be made to appear as a brilliant image c formed by the diffraction grating 12 under the ordinary light source a, and as shown in FIG. 3(b), characters can be made to appear as an image d formed by the spatial phase modulator 14 under the point light source b.

In addition, the design formed by the deflection cell 12 is recorded on the recording surface. Therefore, the brightness of the image does not decrease even under the ordinary light source a, in which the angle of incidence of the illumination light on the optical identifier has a constant spread. That is, even if the optical identifier is illuminated with diffused light, the brightness of the image does not decrease. The same applies to a case where the design is three-dimensionally displayed by the deflection cell 12. The size of the deflection cell may be 1 µm or more and 500 µm or less. The maximum width of the deflection cell may be taken as the size. The deflection cell may be regularly arranged. Furthermore, the deflection cell may be periodically arranged. The arrangement interval of the deflection cell may be 3 µm or more and 1 mm or less. The arrangement interval may be an average value of the arrangement interval of a plurality of deflection cells.

However, because the spatial phase modulator 14 connects focal points at a location away from the recording surface and forms the reproduced image d by means of the focal points, the focal points become blurred when the angle of incidence of the illumination light has a certain spread, which causes the reproduced image d to become dark. As a result, under the ordinary light source a, the design formed by the deflection cells 12 is mainly observed.

On the other hand, when the optical identifier 10 is illuminated with parallel light such as the point light source b, the spread of the incident angle of the illumination light which is incident on a single point of the optical identifier 10 is narrow. Therefore, the light propagating from the spatial phase modulator 14 is focused, and high-brightness points are generated at the focal points.

Furthermore, although the image c of the design of the deflection cells 12 is observed at a specific angle, the range of the deflection direction is narrower than that of the spatial phase modulator 14. For this reason, the image c becomes more difficult to observe with both eyes, and is less easy to visually recognize.

Consequently, under the point light source b, the design formed by the spatial phase modulator 14 is mainly observed.

As a result, according to the configuration of the present invention, an image that clearly changes depending on the lighting can be made to appear and disappear.

Next, a change in a reconstruction point of the reproduced image d in response to the angle of incidence of incident light from the ordinary light source a to the optical identifier 10 will be described.

Figure 4:
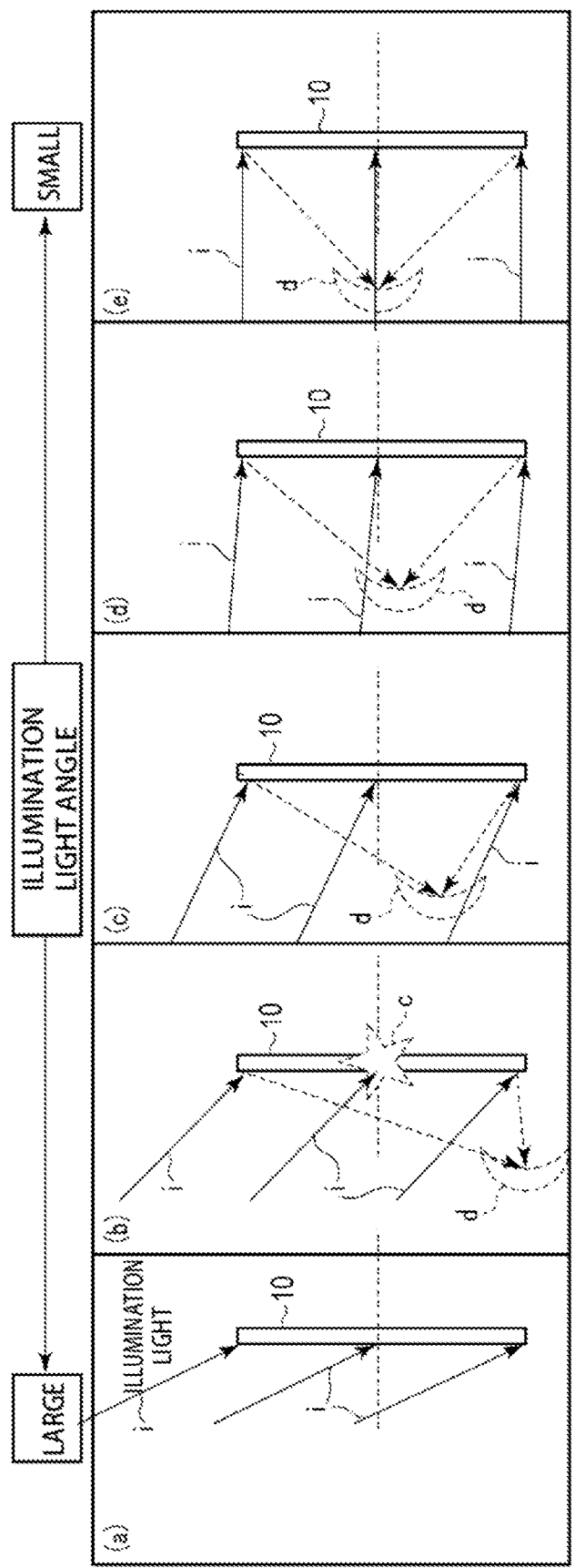
FIG. 4 is a diagram for illustrating a change in the reconstruction point of a reproduced image in response to the angle of incidence of incident light from an ordinary light source to the optical identifier.

FIG. 4 is a diagram for illustrating a change in a reconstruction point of a reproduced image according to the angle of incidence of incident light from an ordinary light source to the optical identifier.

As shown in FIG. 4(a), when the incident light i from the ordinary light source a is incident on the optical identifier 10 at an acute angle, that is, nearly parallel to the optical identifier 10, the reproduced image d is not reproduced. However, as shown in FIG. 4(b), when the angle of incidence increases, a reconstruction point is formed in a space in front of the end portion of the optical identifier 10, and the reproduced image d is reproduced. In the case of FIG. 4(b), the image c formed by the deflection cells 12 is also displayed on the surface of the optical identifier 10. Further, as shown in FIGS. 4(b) to 4(e), the reconstruction point of the reproduced image d shifts to the central side of the optical identifier 10 as the angle of incidence further increases. Then, as shown in FIG. 4(*e*), when the incident light i is incident on the optical identifier 10 from a perpendicular direction, the reconstruction point of the reproduced image d is located in a space in front of the center of the optical identifier 10.

Next, a reconstruction point of a reproduced image which is displayed when diffused light is incident on the optical identifier 10 will be described.

Figure 5:
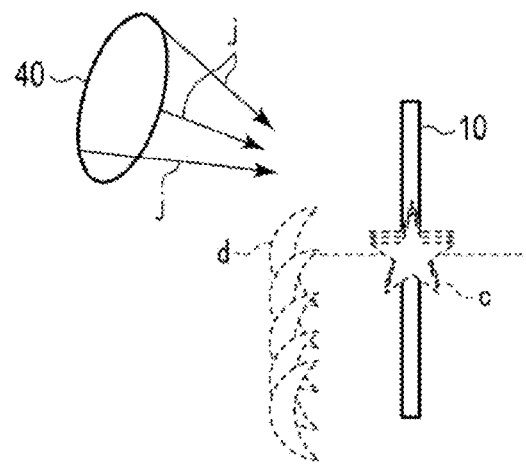
FIG. 5 is a diagram for illustrating the reconstruction point of a reproduced image which is reproduced when diffused light is incident on the optical identifier.

FIG. 5 is a diagram for illustrating a reconstruction point of a reproduced image which is displayed when diffused light is incident on the optical identifier.

The diffused light j may be obtained, for example, as a result of diffusion of ambient light by a diffuser 40. Alternatively, the diffused light j may be illuminated light by a planar light source. When the diffused light j is incident on the optical identifier 10, the image c formed by the deflection cells 12 is displayed on the surface of the optical identifier 10, and the reproduced image d is reproduced in the space in front of the optical identifier 10. Both the image c and the reproduced image d are laterally shifted with respect to the optical identifier 10 according to the angle of incidence of the diffused light j with respect to the optical identifier 10.

Figure 6A:
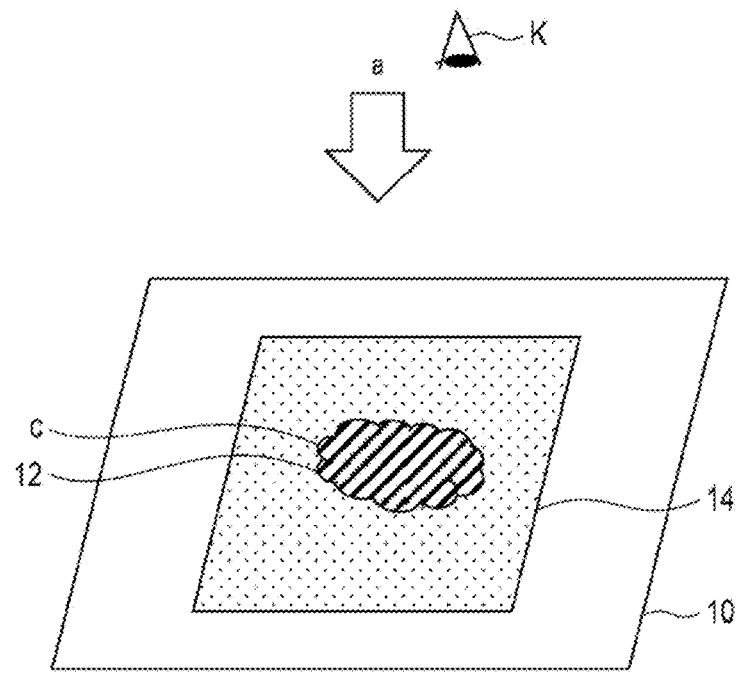
FIGS. 6(A) and 6(B) are explanatory diagrams schematically showing an optical identifier according to an aspect of the present invention, and an image that can be seen when an observer observes the optical identifier (when the reproduced image is a large planar image and covers the variable color image).
Figure 6B:
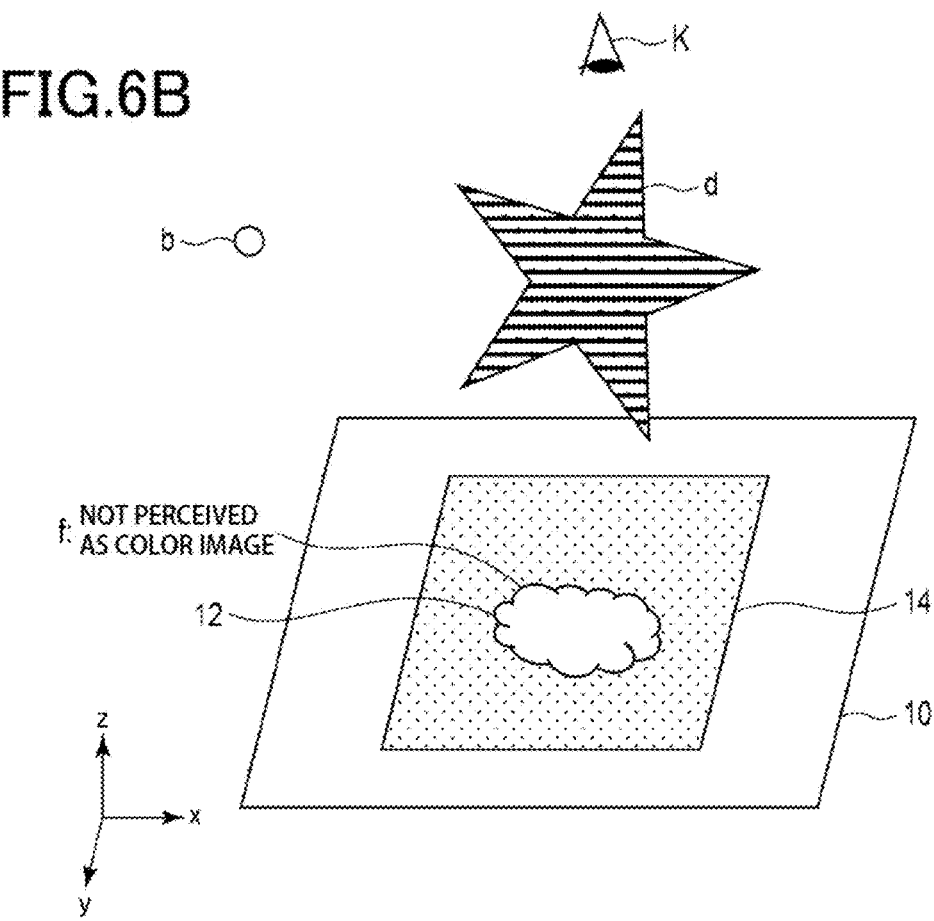

FIGS. 6(A) and 6(B) is an are explanatory diagrams schematically showing an optical identifier according to an aspect of the present invention, and a state of an image that can be seen when an observer K observes the optical identifier, especially when the reproduced image d is a large planar image and covers the brilliant image c.

As shown in FIGS. 6(A) and 6(B), when the reproduced image d is a large planar image compared to the brilliant image c and covers the brilliant image c, illumination of the point light source b causes the brilliant image c to disappear (f) and only the reproduced image d is ob served.

Figure 7A:
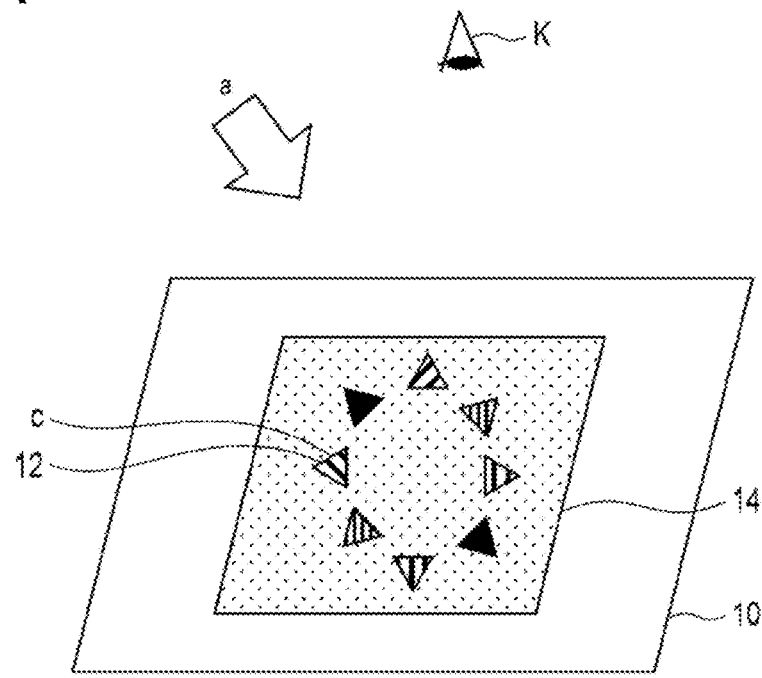
FIGS. 7(A) and 7(B) are explanatory diagrams schematically showing an optical identifier according to an aspect of the present invention, and an image that can be seen when an observer observes the optical identifier (when a combination of the variable color image and the reproduced image completes a single design).
Figure 7B:
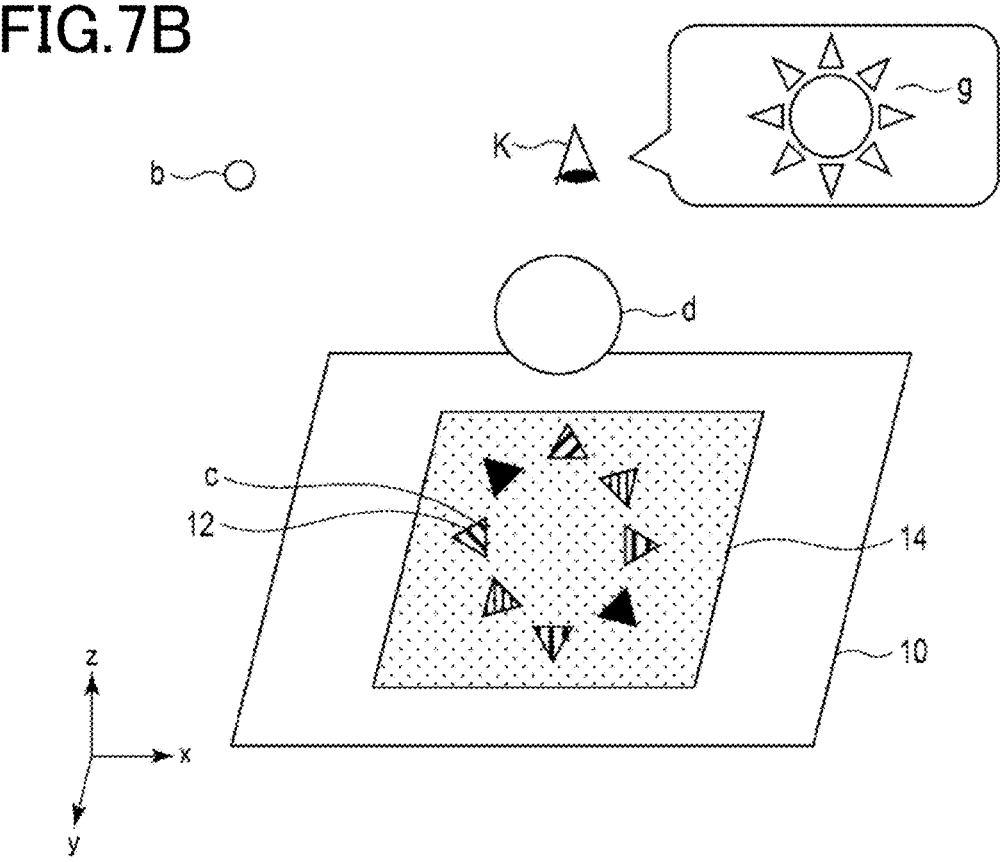

FIGS. 7(A) and 7(B) explanatory diagram schematically showing an optical identifier according to an aspect of the present invention, and a state of an image that can be seen when an observer K observes the optical identifier, especially when a combination of the variable color image c and the reproduced image d completes a single design g. The variable color image and the reproduced image d can represent, individually or in combination, text, signs, signatures, symbols, emblems, flags, portraits, landmarks, mammals, birds, fish, and insects. The variable color image and the reproduced image d can represent images other than these.

As shown in FIG. 7(A), the design provided by the variable color image c individually has a portion of the design missing, and as shown in FIG. 7(B), by illuminating the point light source b with respect to the optical identifier 10 from the same illumination direction as the ordinary light source a, the reproduced image d can be obtained, and the combination of the variable color image c and the reproduced image d can be arranged so as to complete a single design g.

(Description of Spatial Phase Modulator)

The computer hologram provided as the spatial phase modulator 14 can be a Fourier transform hologram or a Fresnel transform hologram. Furthermore, the spatial phase modulator 14 may be a diffraction grating in which a plurality of diffraction lights are focused at a focal point.

A Fresnel conversion hologram can have the fine relief structure described below as disclosed in PCT/JP2017/020049 (International Publication No. WO 2017/209113 A1).

The Fresnel conversion hologram is capable of displaying a reproduced image at a plurality of reconstruction points.

Furthermore, the distance of the reconstruction points from the recording surface on which the Fresnel conversion hologram is recorded is preferably 5 mm or more and 25 mm or less. The reconstruction points may be reproduced on the observer side of the recording surface, or may be reproduced on the opposite side of the recording surface to the observer. In either case, the distance of the reconstruction points from the fine relief structure can be defined in the same way. The phase component of a recorded point is calculated as the sum of the complex amplitudes of the light incident on the recorded point from each reconstruction point, and a phase angle is calculated from the phase component and then recorded as a depth or height of a unit block. When the unit block has a convex shape, it becomes a convex portion of the spatial phase modulator 14. When the unit block has a concave shape, it becomes a concave portion of the spatial phase modulator 14. The upper surface of the convex portion, that is, the surface farthest from the display surface, can be made substantially parallel to the display surface. Here, substantially parallel can be defined as the deviation of the distance between the convex surface and the display surface being sufficiently small with respect to visible light. Specifically, the arithmetic mean roughness Sa may be 5 nm or more and 50 nm or less, and within this range, the calculated phase angle can be recorded as the depth or height of the unit block. Further, the arithmetic mean roughness Sa may be 10 nm or more and 30 nm or less, and within this range, the interference of the reflected light between the upper surface and the other surfaces is sharp. The phase component can be a normalized amplitude of the sum of the complex amplitudes. Moreover, the arrangement interval between the unit blocks may be 10 nm or more 200 nm or less. In addition, the viewing angle θ of the reconstruction points is preferably 5 degrees or more from the viewpoint of visibility of the reproduced image, and preferably 15 degrees or less from the viewpoint of enabling the reconstruction points to more readily disappear. Also, the recording surface on which the unit blocks are not formed can be defined as a flat portion of the spatial phase modulator 14. A Fourier transform hologram can be calculated in the same manner using the reconstruction points of the Fresnel transform hologram as points at infinity, and can be recorded like a Fresnel transform hologram by using the calculated phase angles as the depths or heights of the unit blocks. As a result of the above, the spatial phase modulator 14 modulates the phase of the light from the point light source and displays the reproduced image.

The shape of the unit block can be a square or a rectangle, or a square or a rectangle with rounded corners. Furthermore, the unit block may be fused with an adjacent unit block. The unit block is preferably arranged in a regular arrangement. The regular arrangement can be an arrangement having a spacing within a fixed range, or an evenly spaced arrangement. A typical regular arrangement is a square array or a hexagonal array.

Next, a transfer foil in which the optical identifier 10 is arranged on a carrier will be described.

Figure 8:
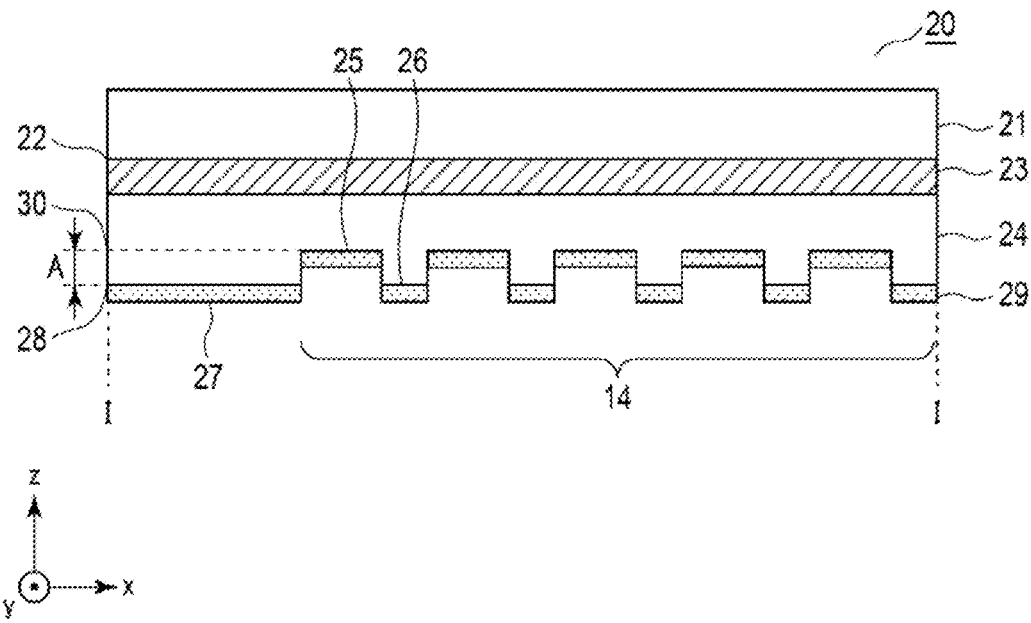
FIG. 8 is a cross-sectional view showing a structural example of a display (when one type of depth is used in the relief structure).
Figure 9:
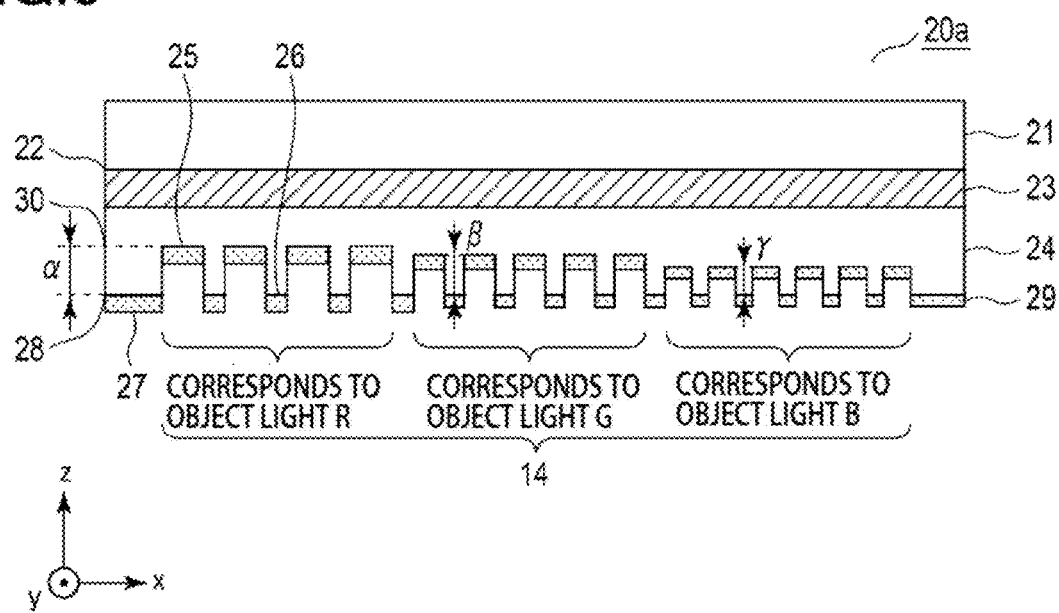
FIG. 9 is a cross-sectional view showing a structural example of a display (when a plurality of types of depths are used in the relief structure).

FIGS. 8 and 9 are cross-sectional views showing structural examples of a transfer foil, where FIG. 8 shows a case where the single type of depth A is used for the concave portion 25 and the convex portion 26, and FIG. 9 shows a case where three types of depths (α, β, and γ) are used.

In the transfer foil 20 illustrated in FIG. 8, a release layer 23 is provided on the surface contacting the surface 22 of the carrier 21, and a functional layer 24 is provided on the release layer 23 on the surface opposite to the surface 22. Concave portions 25 and convex portions 26 are formed on the surface of the functional layer 24 as the spatial phase modulator 14. The section of the functional layer 24 on which the spatial phase modulator 14 is not formed is a flat portion 27. The upper surface 28 of the functional layer 24 is covered with a deposition layer 29. The depths A of the concave portions 25 and the convex portions 26 of the spatial phase modulator 14, that is, the distances from the bottom surface 30 to the top surface 28, are set to the same distance.

On the other hand, in the transfer foil 20a shown in FIG. 9, the concave portions 25 and the convex portions 26 of the spatial phase modulator 14 have a plurality (three in the example of FIG. 9) of depths $\alpha$, $\beta$, and $\gamma$ (where $\alpha > \beta > \gamma$). In this case, the color of the reproduced three-dimensional image can be made to have any color by adjusting the mixing ratio of the depths $\alpha$, $\beta$, and $\gamma$.

The deflection cell can be configured by a diffraction grating, a directional scattering structure, or a tilted mirror. Diffraction gratings and tilted mirrors have a function of changing the direction in which incident light travels. A structural color based on diffraction, scattering, or interference can also be an example of a configuration provided in a deflection cell.

Here, the respective spatial frequencies and intensity distributions of the emerging light when white light from the diffraction grating 12 or the spatial phase modulator 14 is used as the incident light will be described. First, cases where the spatial frequency of the diffraction grating 12 is, for example, 1,100 lines/mm, 1,300 lines/mm, and 1,500 lines/mm will be described when the incident light is incident at an angle of 45 degrees with respect to the transfer foil and the observation angle is 90 degrees with respect to the transfer foil 20. That is, a distribution of emerging light having a distribution centered on the diffraction wavelength corresponding to each spatial frequency reaches the observer.

On the other hand, because the reproduced image from the spatial phase modulator 14 is provided so as to merge at the reconstruction point, the spatial frequency of the diffraction grating 12 is different due to the spatial phase modulators 14 inside the phase modulator area. Therefore, the spatial frequency required for merging at an arbitrary reconstruction point is not limited to a specific value, and is a collection of various spatial frequencies having a width. When the intensity distribution of the emerging light with respect to the spatial frequency of the diffraction grating 12 is compared with the intensity distribution of the emerging light with respect to the spatial frequency of the spatial phase modulator 14, the spatial phase modulator 14 has a greater width with respect to the spatial frequency.

When the diffraction grating 12 has a plurality of spatial frequencies, the observer observes light having a diffraction wavelength corresponding to the spatial frequencies. In reality, the diffraction wavelength can be dispersed due to molding non-uniformities in the diffraction grating 12 that form when producing the original mold or during embossing, and due to surface unevenness of the resin material. For the observer, this dispersion of the diffraction wavelength represents noise with respect to the peak wavelength, and reduces the visibility of the color image. On the other hand, because the spatial phase modulator 14 has a continuous spatial frequency compared to the diffraction grating 12, the noise generated by the diffraction grating 12 can be blurred, which has the effect of mitigating the noise.

The range of spatial frequencies in the diffraction grating may be 400 lines/mm or more and 1,600 lines/mm or less. Furthermore, the range of the pitch in the diffraction grating may be 0.5 µm or more and 2 µm or less. The range of depths may be 0.05 µm or more and 0.5 µm or less. The spatial frequency, pitch, and depth of the directional scattering structure may be in the same ranges as those of the diffraction grating. The cross-sectional shape of the diffraction grating may be a sine wave, a blazed shape, a staircase shape, or a combination thereof. The diffraction grating may have one frequency component. Furthermore, a plurality of discrete frequency components may be provided. Moreover, the directional scattering structure may have a continuous frequency distribution. The frequency distribution may take the form of a Gaussian distribution. When a plurality of frequency components are included, it is preferable that the wave vectors corresponding to the frequency components are parallel to each other. When they are not parallel, the direction variation of the wave vectors is preferably within 10 degrees. When the deflection cells are composed of an inclined mirror, the arrangement pitch can be larger than 2 µm and 20 µm or less. The depth may be greater than 0.5 µm and 3 µm or less.

Generally, when the periphery of the deflection cells 12 is flat, the flat portion is susceptible to the embossing pressure, which can cause the embossing pressure to escape to the flat portion such that the embossing pressure is less likely to be applied to the deflection cells 12.

Figure 10:
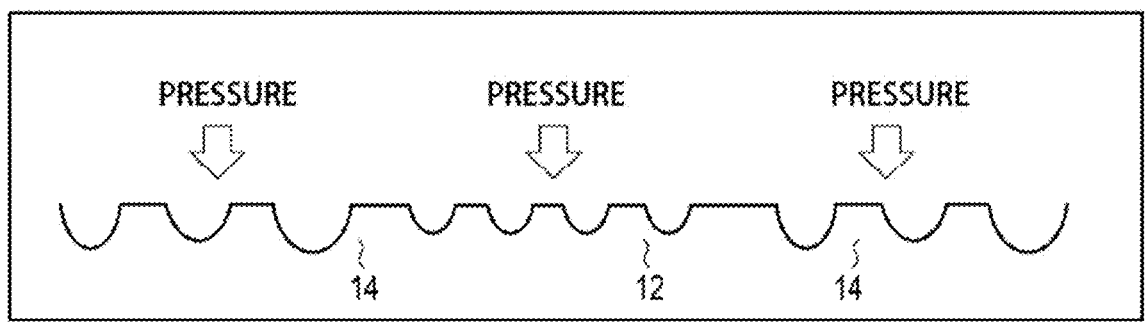
FIG. 10 is a schematic view of a cross-section of an optical identifier having a diffraction grating with the relief structure of a spatial phase modulator formed in the periphery thereof.

FIG. 10 is a schematic view of a cross-section of an optical identifier having a diffraction grating with the relief structure of a spatial phase modulator formed in the periphery thereof.

However, as shown in FIG. 10, when the relief structure of the spatial phase modulator 14 is formed in the periphery, the pressure is evenly applied to the diffraction grating and the relief structure of the spatial phase modulator 14, which improves the moldability.

The spatial frequency of the spatial phase modulators 14 is preferably 1 line/mm or more and 500 lines/mm or less, and the spatial frequency of the deflection cells 12 is preferably larger than 500 lines/mm and 1800 lines/mm or less. The depth may be 0.15 µm or more and 0.8 µm or less. Furthermore, the structural average depth when averaged in the area of the cell 32 with the spatial phase modulator 14 may be within ±50% with respect to the average depth of the deflection cells 12.

Moreover, because the deflection cells 12 are surrounded by the spatial phase modulator 14, the formation of small cracks in the deflection cells 12 can be prevented. This is because the spatial phase modulator 14 serves as a buffer against stress toward the deflection cells 12. Also, the optical identifier 10 can be arranged between transition zones, the two structures serving as transition zones. Although small cracks tend to occur in the diffraction grating 12 of the optical identifier 10, as a result of the structure in which the deflection cell is surrounded by the spatial phase modulator 14, the problem of small cracks forming in the deflection cell can be resolved. Further, external forces toward the optical identifier 10 can be released to the transition zones. The transition zones have a relief structure with a coarser pitch than the optical identifier 10. The width of the transition zones of the optical identifier 10 may be constant or may change continuously. In addition, the width of the transition zones of the optical identifier 10 may be 1 mm or more and 30 mm or less. Furthermore, the transition zones of the optical identifier 10 may be curved, straight, or a combination thereof. In the optical identifier 10, the density of the number of cells may be constant or be modulated in a stepwise manner. When the density of the number of cells is modulated in a stepwise manner, the stress is more likely to be relieved and the aesthetics are more likely to be improved.

(Description of Cell Arrangement)

A variable color image can be realized by providing a collection of cells provided with a diffraction grating 12 corresponding to the variable color image. As described in WO2017/183718, the fact that incident light is dispersed according to the spatial frequency of the diffraction grating can be used to arbitrarily combine a plurality of diffraction gratings having different spatial frequencies.

For example, as a method of expressing an arbitrary color, when diffraction gratings having spatial frequencies corresponding to R (red), G (green), and B (blue) are included, and light is dispersed by each of the diffraction gratings, the wavelengths of the diffraction light observed at a specific angle can be made to correspond to R (red), G (green), and B (blue), respectively. Consequently, when the transfer foil 20 is observed from an arbitrary angle, the observer perceives a specific color due to the mixing of the specific wavelengths diffracted by the R, G, and B diffraction gratings. Therefore, by arranging the R, G, and B diffraction gratings in an appropriate manner, and by modulating the areas of those cells, it is possible to display an appropriate variable color image with the diffraction gratings.

Figure 11:
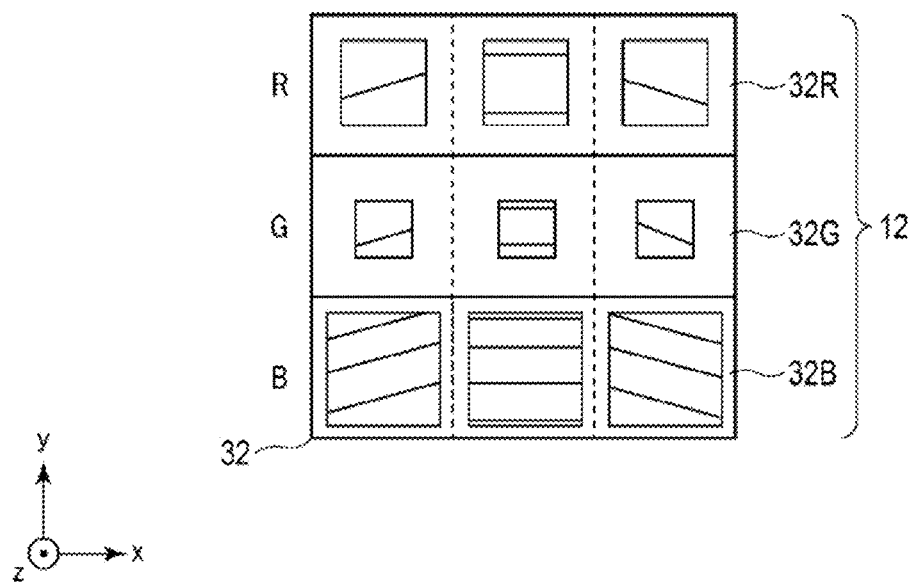
FIG. 11 is a plan view showing an example of a deflection cell that realizes a variable color image (when wide R, G, and B components are arranged in the Y direction).
Figure 12:
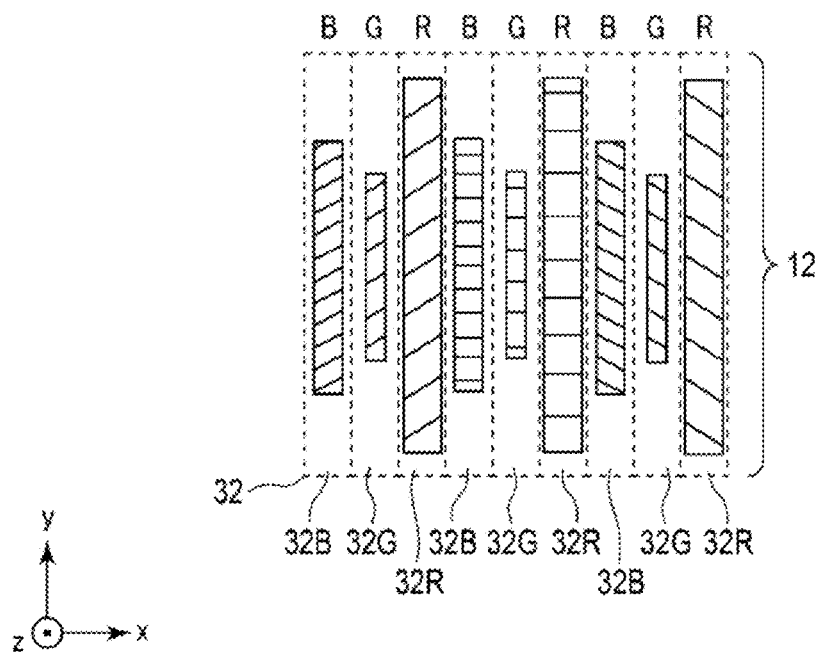
FIG. 12 is a plan view showing an example of a deflection cell that realizes a variable color image (when narrow R, G, and B components are arranged in the X direction).
Figure 13:
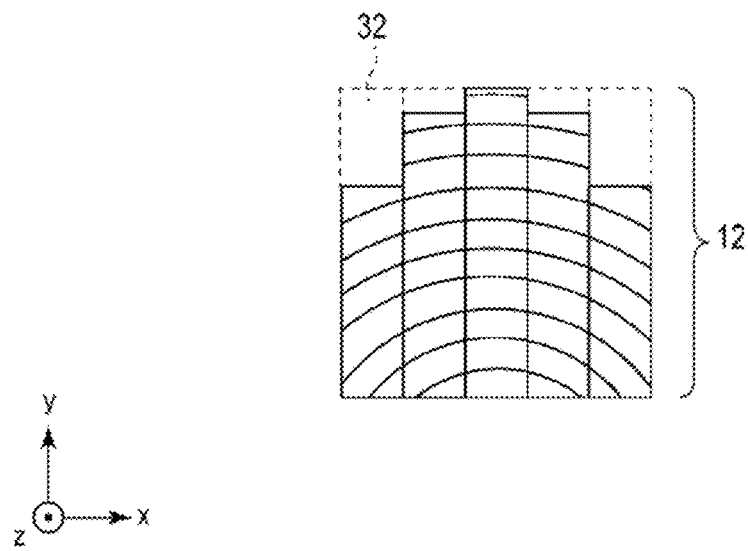
FIG. 13 is a plan view showing an example of a deflection cell that realizes a variable color image.

As shown in FIGS. 11, 12, and 13, each of the deflection cells 12 can be arranged in a unit cell 32.

Each of FIGS. 11, 12, and 13 are plan views showing an example of deflection cells 12 that realize a variable color image. FIG. 11 is an arrangement in which unit cells 32R, 32G, and 32B corresponding to wide red (R), green (G), and blue (B) components are stacked in the Y direction, that is, the vertical direction of the image. FIG. 12 is an arrangement in which unit cells 32R, 32G, and 32B corresponding to narrow red (R), green (G), and blue (B) components are stacked in the X direction, that is, the horizontal direction of the image. Note that, in the present specification, when unit cells are generically described without distinguishing the colors, they are simply collectively referred to as "unit cell 32" in the following description. Furthermore, the unit cell 32 accommodates deflection cells comprising a diffraction grating 12. The plurality of unit cells 32R, 32G, and 32B can represent a single pixel of the variable color image. In the following, a case where the deflection cells comprise a diffraction grating 12 will be described, but the same applies when the deflection cells comprise a directional scattering structure or an inclined mirror. Moreover, the same applies when a diffraction grating 12, a directional scattering structure, and an inclined mirror are all provided in the deflection cells.

As shown in FIG. 11, when the unit cells 32R, 32G, and 32B of the wide R, G, and B components are arranged in the Y direction, that is, stacked in the vertical direction of the image, a plurality of orientations of diffraction gratings 12 having an arbitrary number of spatial frequencies are installed so as to be more adjacent to the observation direction than the case shown in FIG. 12, in which the unit cells 32R, 32G, and 32B of the narrow R, G, and B components are arranged in the X direction, that is, stacked in the horizontal direction of the image, and therefore, the color change is small when the transfer foil 20 is tilted when being observed.

On the other hand, when installed as shown in FIG. 12, the grooves of the diffraction grating 12 provided in a diagonal direction with respect to the unit cell 32 can be efficiently provided in terms of area. For example, if the dimensions of the unit cell 32 is not very large compared to the spatial frequency, the number of grooves of the diffraction grating 12 provided in the unit cells 32R, 32G, and 32B becomes smaller, however this arrangement is useful because the grooves of the diffraction grating are arranged so as to intersect the long side of the deflection cell 12, and the number of grooves does not decrease even if the pixels are divided into each of the deflection cells. Furthermore, according to such an arrangement of cells, it is possible to prevent a decrease in saturation of the variable color image due to a reduction in pixels.

FIG. 13 is also a plan view showing an example of the cells of a diffraction grating 12 that realizes a variable color image.

In the case of the configuration shown in FIG. 13, the diffraction grating 12 is stacked in a building block shape, and the deflection cells are provided inside the unit cell 32 with a variable area of the stacked region according to the parallax image. In this case, the variable color image can be realized by providing the pixel with deflection cells having different spatial frequencies of the diffraction grating to each other, in the same manner as in FIG. 12.

In order to obtain a variable color image, the area ratio of the deflection cells 12 occupied by the R, G, and B unit cells 32R, 32G, 32B of R, G, and B is changed. Here, the unit cell 32 may have a region in which each of the deflection cells 32R, 32G, and 32B are not formed.

Figure 14:
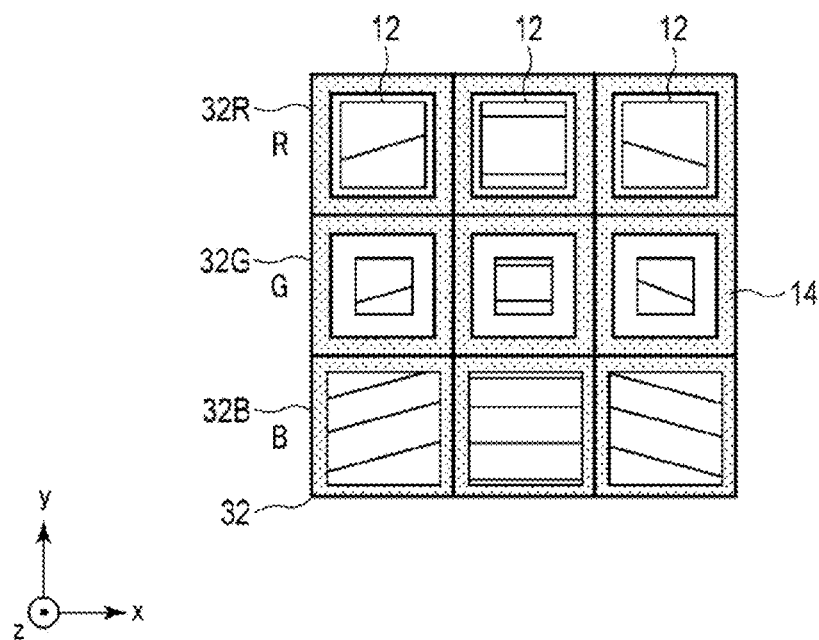
FIG. 14 is a plan view showing an example of the cell arrangement of the recording surface of an optical identifier (when the area of the diffraction gratings is standardized).

FIG. 14 is a plan view showing an example of the cell arrangement of an optical identifier in a case where the area of the deflection cells is standardized. That is, the maximum size occupied by a deflection cell in a pixel is constant.

As shown in FIG. 14, the spatial phase modulator 14 can be provided in an area in which the diffraction grating 12 is not provided. For example, suppose that the occupancy rate of the R, G, and B unit cells 32R, 32G, 32B is at most 50% inside the pixel. Then, the spatial phase modulator 14 can be provided in the remaining 50%. As a result of this arrangement, the spatial phase modulator 14 can be provided in a region that is normally unstructured without disturbing the coloration of the variable color image formed by the diffraction grating 12. In this case, compared to a case where the diffraction grating 12 and the spatial phase modulator 14 described later are provided in separate cells 32, it is possible for the diffraction grating 12 for the variable color image c and the spatial phase modulator 14 for the reproduced image d to both exist even though the area is effectively used. As described above, in a gap between each deflection cell 12 and the spatial phase modulator 14, the space between the deflection cells 12 can be filled with the spatial phase modulator 14. Furthermore, the space between the deflection cells 12 may be simply filled with the spatial phase modulator 14.

Figure 15:
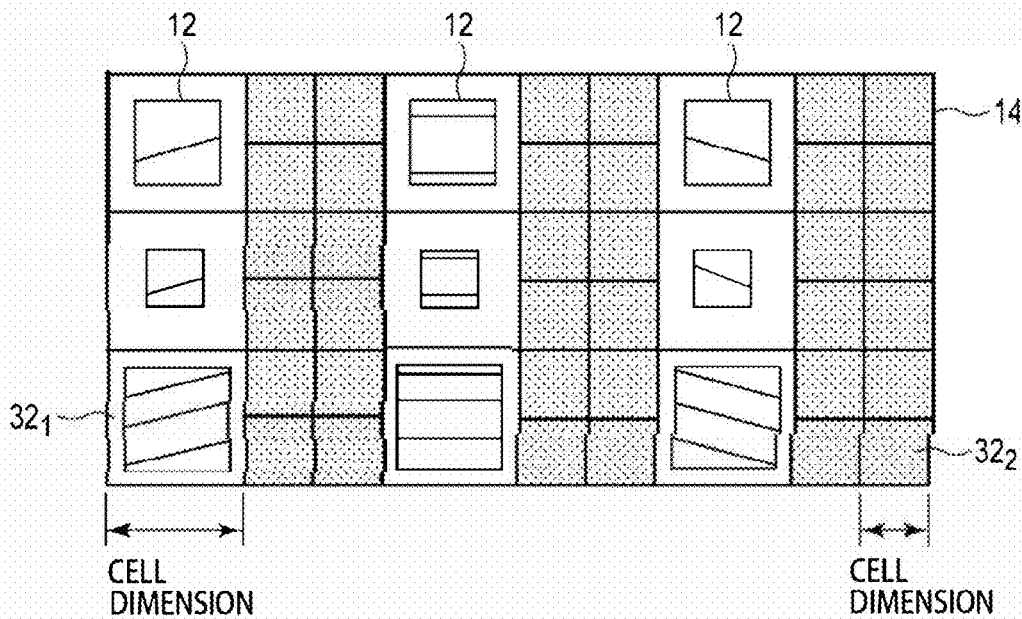
FIG. 15 is a plan view showing an example of the cell arrangement of the recording surface of an optical identifier (when the cell dimension of the diffraction gratings and the cell dimension of the phase modulation elements are different).

Furthermore, as illustrated in FIG. 15, the unit cells of the diffraction grating 12 for obtaining the variable color image c and the cell of the spatial phase modulator for obtaining the reproduced image d may also be separately provided.

FIG. 15 is a plan view showing an example of the cell arrangement of an optical identifier, in which the cell dimension of the unit cells that accommodate the deflection cell of the diffraction grating and the cell dimension of the spatial phase modulator are different.

In this case, the dimension of the cell 321 that accommodates the deflection cells of the diffraction grating 12 and the dimension of the cell 322 of the spatial phase modulator 14 can be individually determined, that is, the resolutions of the variable color image c and the reproduced image d can be individually determined, which increases the degree of freedom of expression. Furthermore, the dimensions of the cells 321 and 322 can be independently set according to the sharpness of the variable color image c and the reproduced image d of the desired optical film 10, and the production time of the structure.

Figure 16:
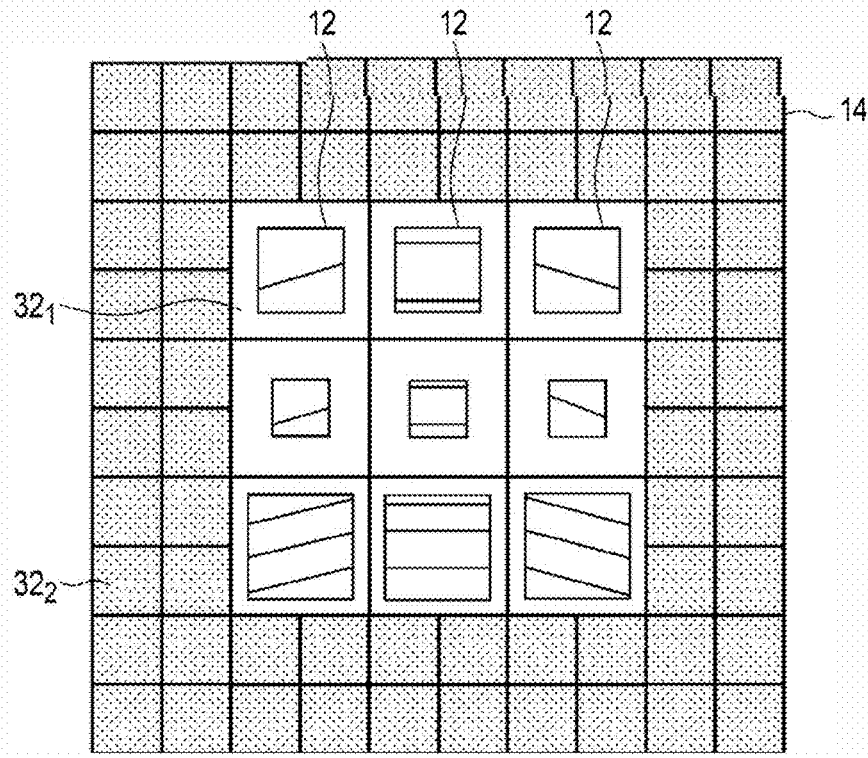
FIG. 16 is a plan view showing an example of the cell arrangement of the recording surface of an optical identifier (when the periphery of the diffraction grating cells and is covered by the phase modulation element cells).

FIG. 16 is a plan view showing an example of the cell arrangement of an optical identifier, in which the periphery of the deflection cell pixel is covered by spatial phase modulator cells.

As shown in FIG. 16, it is possible to arrange the cells 32 provided with the spatial phase modulator 14 for obtaining the reproduced image d such that they surround the pixel, which is a collection of unit cells 321 that accommodate diffraction gratings 12 for obtaining the variable color image c.

In this case, because the spatial phase modulator 14 and the diffraction grating 12 are provided in different area to each other, there are fewer adjacent lines between the diffraction grating 12 and the spatial phase modulator 14 than a case where the cells 321 of the diffraction grating 12 mentioned above and the cells 322 of the spatial phase modulator 14 are alternately provided. Consequently, the resin that is likely to be present at the boundary between different structures during embossing is less likely to remain on the mold, and there is an advantage that production is easier. The effect is particularly significant when a thermoplastic material is used for the optical functional layer.

FIG. 17 is a plan view showing an example of an optical identifier which includes unit cells in which a deflection cell and a spatial phase modulator are mixed at an arbitrary ratio in addition to unit cells having only an arc-shaped deflection cell.

As shown in FIG. 17, it is possible to arrange in a single pixel 32 cells having only an arc-shaped deflection cell 12, and unit cells in which the deflection cell 12 and the spatial phase modulator 14 are mixed in an arbitrary ratio.

Further, by arbitrarily setting the orientation of the diffraction grating 12 for realizing the variable color image c, the observation angle in which the variable color image c can be observed can be changed. Here, the orientation of the grating does not have to be limited to one orientation, and a plurality of orientations can be used. For example, when multiple orientations of the gratings are used, it is possible to widen the range of observation angles in which the variable color image c can be observed. Similarly, in terms of the reproduced image d, the illumination angle of the point light source b with respect to the optical identifier 10 and the angle in which the reproduced image is obtained can be arbitrarily designed. Therefore, the observation angle at which the variable color image c and the reproduced images d can be observed can be freely designed.

(Description of Layer Configuration)

Next, the layer structure of the transfer foil, which has the optical identifier provided on the carrier, and the production method of the transfer foil will be described. The layer structure of the transfer foil may be arranged in the order of the carrier/release layer/functional layer/deposition layer/adhesion layer. An adhesion layer, an anchor layer, and a printed layer may be provided between the layers. Furthermore, the material of the release layer and the functional layer may be a light-transmitting resin such as a thermoplastic resin or a photocurable resin. When a thermoplastic resin or a photocurable resin is used, an uneven shape can be formed on the interface of the functional layer from an original mold on which an uneven shape is formed. The interface on which the uneven shape is formed may be used as the recording surface. The uneven shape is formed on the recording surface, which is the opposite surface to the surface in contact with the carrier of the functional layer. That is, the deposition layer may cover the entire functional layer, and in this case, the interface between the functional layer and the deposition layer may be used as the recording layer. The deposition layer may also partially cover the functional layer. When the deposition layer partially covers the functional layer, the recording surface may be the interface between the functional layer and the deposition layer or the interface between the functional layer and the adhesion layer. Furthermore, the surface with which the carrier and the release layer make contact serves as the display surface. The display surface is parallel to the surface of the carrier.

The carrier is a plastic film or a plastic sheet. The carrier itself can be handled independently. The material of the carrier can be polyethylene terephthalate (PET), polypropylene (PP), polyethylene (PE) or polycarbonate (PC). The relief structure of the recording surface is obtained by applying a thermoplastic resin or a curable resin on the carrier as the release layer, and after further applying the functional layer, by pressing the original mold formed with an uneven shape on the recording surface of the functional layer. The release layer, the functional layer, and the adhesion layer can be formed of a resin. The resin can be an oligomer, a polymer or a mixture thereof. Furthermore, the resin may contain inorganic particles, organic particles, or both. The resin forming these layers can be a thermoplastic resin or a cured resin. Examples of the various resins include poly(meth)acrylic resins, polyurethane resins, fluororesins, silicone resins, polyimide resins, epoxy resins, polyethylene resins, polypropylene resins, methacrylic resins, cyclic polyolefin resins, polystyrene resins, polycarbonate resins, polyester resins, polyamide resins, polyamide-imide resins, and cellulose resins. The polystyrene resin may be an acrylonitrile-(poly)styrene copolymer (AS resin), an acrylonitrile-butadiene-styrene copolymer (ABS resin), or the like. The material forming the release layer, the functional layer, and the adhesion layer can be one of the above resins. Alternatively, they can be a mixture or composite of two or more resins. If no curing agent is added, then a thermoplastic resin is used as the resin. The thickness of the carrier may be 25 μm or more and 500 μm or less. The thickness of the release layer may be 0.3 μm or more and 2 μm or less. The thickness of the functional layer may be 0.5 μm or more and 15 μm or less. The adhesion layer may be 3 μm or more to 20 μm or less.

The optical identifier may further include additional layers such as an adhesive layer and a resin layer. The adhesive layer is provided, for example, to cover the deposition layer.

The material of the deposition layer may be a metal, a metal compound, or silicon oxide. Aluminum, silver, gold, and alloys thereof can be used as the metal. The metal compound may be oxides, sulfides, nitrides, or fluorides of aluminum, zinc, titanium, or tin. Examples of metal compounds include zinc sulfide, titanium oxide and aluminum oxide. The deposition layer may be formed by a deposition method. The deposition method may be a physical deposition method or a chemical deposition method. The physical deposition method may be a vacuum vapor deposition method or a sputtering method. The deposition layer may be a monolayer or a multilayer.

The deposition layer is provided by depositing 50 nm of aluminum on a light transmitting layer using a vacuum vapor deposition method. If the deposition layer is extremely thin, the light transmittance of the deposition layer increases, which causes the light reflectance to be low. The deposition layer may be 20 nm or more and 100 nm or less.

The optical identifier can be attached to printed matter as an anti-counterfeiting label. Examples of the printed matter are banknotes, cards, pages and packages. PET is used as the carrier of the optical identifier, a thermoplastic resin release layer is formed on the carrier, a functional layer is formed on the release layer, and a deposition layer is deposited on the functional layer. An adhesion layer is further provided. This adhesive layer is attached to the optical identifier, and the printed matter supports the optical identifier. Because the optical identifier itself is difficult to counterfeit or imitate, when the optical identifier is supported by the printed matter, it is difficult to counterfeit or imitate the printed matter with the optical identifier.

FIGS. 18(A) and 18(B) are diagrams for illustrating a difference in the visible range due to a difference in the light source of a deflection cell.

In the deflection cell 12, because the image c is obtained from the diffraction grating, and because the diffraction angle is different for each wavelength in FIG. 18(a) where the point light source b is used as the light source, the diffraction light of white light has a spread of light in the y direction, but does not have a spread of light in the y direction at a single wavelength, and the light only spreads in the x direction. On the other hand, in the case of FIG. 18(b) where α normal diffused light source a is used as the light source, light spreads in both the y direction and the x direction. Therefore, as shown in the case of FIG. 18(a), under illumination of parallel light from the point light source b, the angle at which light having the designed wavelength is observed in the y direction becomes a pinpoint angle, such that the visible range is narrow and is not easily observed. However, when illuminated with diffused light, because the light also spreads in the y direction, the visible range becomes wider and the light is more easily observed.

On the other hand, because the reproduced image displayed by the relief structure of the spatial phase modulator has a spread of light in both the x and y directions, it is observable over a wide range of angles even under illumination with parallel light, and further, parallel light enables a clear 3D image to be obtained as a result of the diffraction light from the spatial phase modulator being focused at the designed reconstruction points. However, when illuminated with substantially diffused light, the diffraction light from the spatial phase modulator is not focused on a single point and is dispersed in the x and y directions, which causes blurring of the reproduced image.

Figure 19:
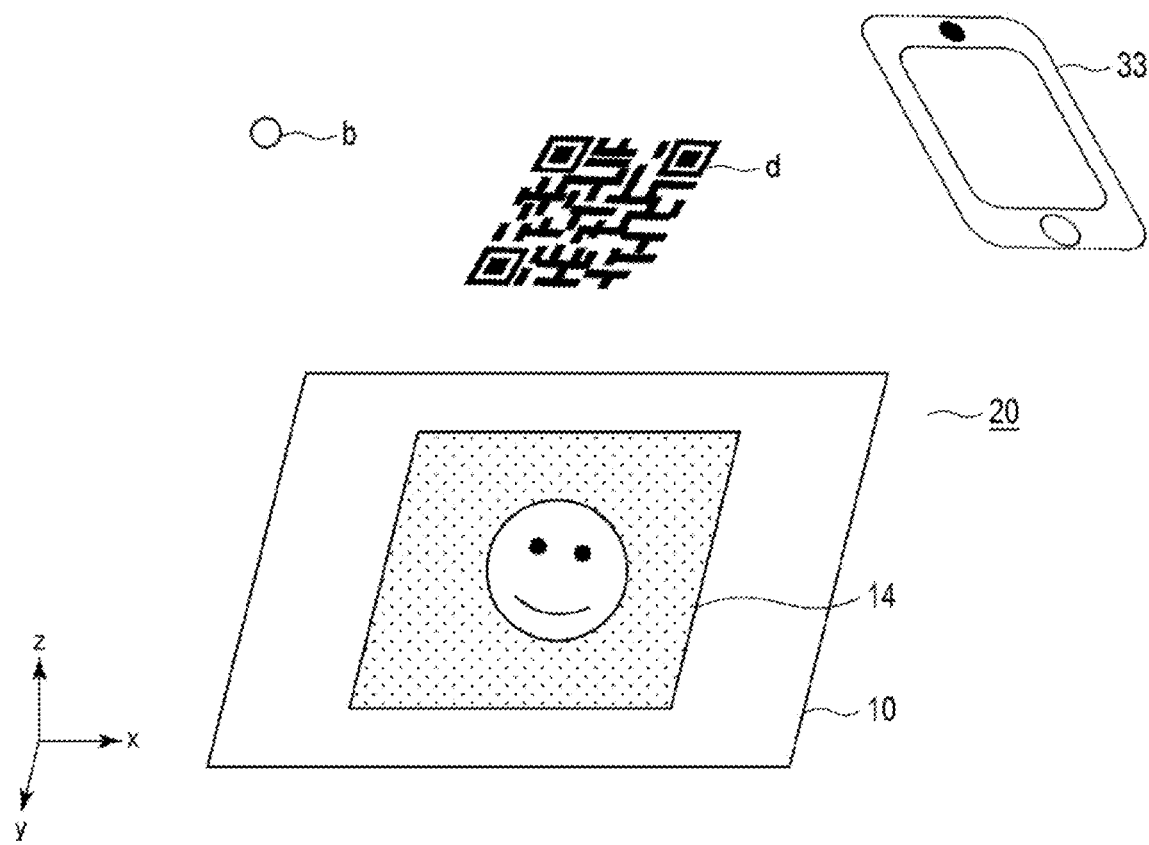
FIG. 19 is a diagram illustrating an example of how a reproduced image is mechanically read.

FIG. 19 is a diagram illustrating an example of how a reproduced image produced by the display is mechanically read.

By using the above principles, for example, the reproduced image d can be mechanically readable as shown in FIG. 19. For example, the reproduced image d can be read by using a general-purpose reading device 33 such as a smartphone. If the reproduced image d is code information containing a link, and is in the product information of the card or article on which the optical film 10 is supported, the reproduced image d can be read by a reading device 33 such as by a smartphone, and the web page of the product information can be accessed by accessing the link.

Furthermore, the transfer foil can be transferred to a paper. The layer structure of the display 20 to which the transfer foil is transferred may be paper with an adhesion layer, a deposition layer, a light transmitting layer, and a release layer arranged on the paper. At this time, the deposition layer can be an aluminum layer, and the material of the light transmitting layer can be an ultraviolet curable resin. By pressing the adhesion layer against the paper and transferring it with a hot press, the optical identifier is transferred onto the paper, and by releasing the PET of the base material, the optical identifier can be provided as a foil on the paper. The paper of the display may be printed. Furthermore, the transfer foil 20 can be transferred to a polymer film.

Figure 20:
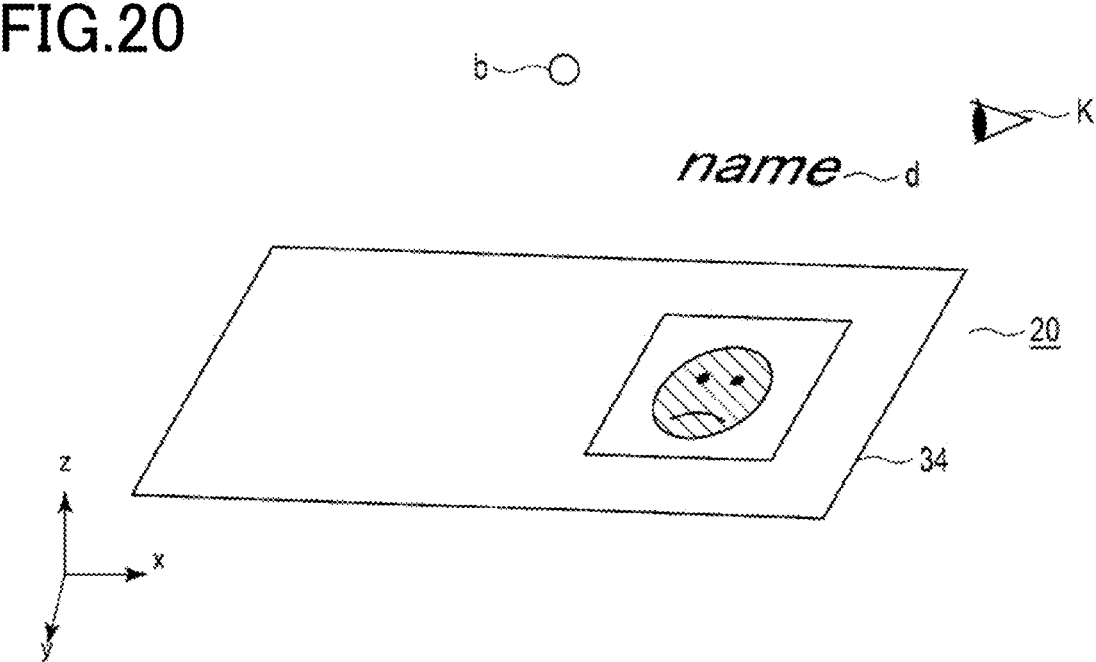
FIG. 20 is a diagram illustrating an example of an optical identifier.

FIG. 20 is a diagram illustrating a usage example of an optical identifier.

For example, as a result of the transfer described above, it is possible to obtain a banknote 34 as shown in FIG. 20 to which the optical identifier 10 of the present invention has been transferred.

In this case, for example, the color image d that can be observed by normal observation can be used as a portrait. Then, when illuminated by the parallel light of the point light source b, a signature "name" corresponding to the portrait can be reproduced as the reproduced image d. As a result of using the signature "name" as a latent image, the eye-catching effect can be enhanced.

EXAMPLES

Figure 21:
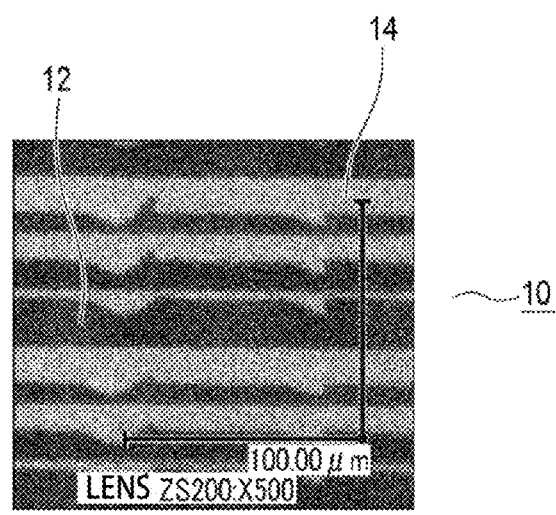
FIG. 21 is an optical microscope image illustrating an example of the optical identifier of the present invention.

FIG. 21 is an optical microscope photograph illustrating an embodiment of the optical identifier of the present invention.

The present invention is not limited to the embodiments described above, but may be modified in various ways when implemented, without departing from the spirit of the present invention. Furthermore, the embodiments may be implemented in combination. In this case, synergistic effects may be obtained owing to the combination. Furthermore, the embodiments described above include inventions of various stages, and a plurality of disclosed elements may be appropriately combined to enable the extraction of various inventions.

Further, the scope of the present disclosure is not limited to the embodiment that has been illustrated and described above, but can also include all embodiments that provide advantages equivalent to those targeted by the present invention. Further, the scope of the present disclosure is not limited to the features of the invention defined by the claims but includes all disclosed features and combinations of those features.

The terms "cell", "part", "pixel", "region", "layer", "plane", "optical identifier", "display", "article", "record", "medium", "base material", and "printing" used in the present disclosure represent a physical existence. The physical existence can refer to a physical form or a spatial form surrounded by matter. The physical existence can be characterized by the material, physical properties, physical quantities, psychophysical quantities, arrangement, form, external shape, and statistical quantities of these characteristics, as well as recorded information, recorded data, recorded codes, readable information, readable data, readable code, capabilities, performance, appearance, colors, spectra, formed/displayed images, processing methods, identification methods, detection methods, verification methods, determination methods, and the like. Furthermore, as a result of the characteristics of the physical existence, the physical existence can have a specific function. A set of physical existences having specific functions can exhibit a synergistic effect between the functions of the physical existences.

Reference should be made to the drawings as necessary when interpreting terms, configurations, features, aspects, and embodiments. Matters that can be directly and unambiguously derived from the drawings should be grounds for amendment comparable to the text.

The terms used in the present disclosure and particularly in the claims are generally intended as "open" terms (e.g., the term "has" should be interpreted as "at least has", and the term "includes" should be interpreted as "includes, but is not limited to", and the like). Moreover, if the claims do not explicitly state a particular number, then there is no intent to represent a particular number. For example, for the sake of clarity, the claims can use introductory phrases, such as "at least one" or "one or more", in the claim recitation. However, the use of such phrases should not be interpreted as meaning that the description in a specific claim with the indefinite article "a" and "an" is limited to one embodiment including such a description. The phrases "one or more" and "at least one", and the indefinite articles "a" and "an" should be at least interpreted as meaning "at 1

What is claimed is:

1. An optical identifier comprising:
   a recording surface comprising:
      a red unit cell comprising a plurality of red pixels, each red pixel of the plurality of red pixels consists of a red diffraction grating occupying at most 50% of the pixel and a spatial phase modulator surrounding the diffraction grating;
      a green unit cell comprising a plurality of green pixels, each green pixel of the plurality of green pixels consists of a green diffraction grating occupying at most 50% of the pixel and a spatial phase modulator surrounding the diffraction grating; and
      a blue unit cell comprising a plurality of blue pixels, each blue pixel of the plurality of blue pixels consists of a blue diffraction grating occupying at most 50% of the pixel and a spatial phase modulator surrounding the diffraction grating;
   a deposition layer covering part or all of the recording surface, wherein
   each of the diffraction gratings of the red, green and blue unit cells has a spatial frequency expressed in a form of a relief structure;
   the diffraction gratings of the red, green and blue unit cells have regular intervals away from each other,
   a variable color image is recorded by the red, green and blue unit cells,
   the spatial phase modulator having thereon a distribution of phase differences recorded in a form of heights of the relief structure of the corresponding diffraction grating, the spatial phase modulator modulating a phase of light outputted from a point light source and displaying a reproduced image;
   the diffraction gratings of the red, green and blue unit cells diffract diffused light and deflect the diffused light by directional scattering, the diffraction gratings of the red, green and blue unit cells display the variable color image recorded in a form of heights of the respective relief structure.

2. The optical identifier of claim 1, wherein the red pixels of the plurality red pixels of the red unit cell are arranged in a first row, the green pixels of the plurality green pixels of the green unit cell are arranged in a second row adjacent to the first row, and the blue pixels of the plurality blue pixels of the blue unit cell are arranged in a third row adjacent to the second row.

3. An optical identifier comprising:
   a recording surface comprising:
      a first unit cell comprising a plurality of first pixels arranged in a first row, each first pixel of the plurality of first pixels comprises a diffraction grating;
      a first phase modulator adjacent to the first row;
      a second unit cell comprising a plurality of second pixels arranged in a second row adjacent to the first phase modulator, each pixel of the plurality of second pixels comprises a diffraction grating;
      a second phase modulator adjacent to the second row;
      a third unit cell comprising a plurality of third pixels arranged in a third row, each pixel of the plurality of third pixels comprises a diffraction grating,
   a deposition layer covering part or all of the recording surface, wherein
   each of the diffraction gratings of the first, second and third unit cells has a spatial frequency expressed in a form of a relief structure;
   the diffraction gratings of the first, second and third unit cells have regular intervals away from each other,
   a variable color image is recorded by the first, second and third unit cells,
   the spatial phase modulator having thereon a distribution of phase differences recorded in a form of heights of the relief structure, the spatial phase modulator modulating a phase of light outputted from a point light source and displaying a reproduced image;
   the diffraction gratings of the first, second and third unit cells diffract diffused light and deflect the diffused light by directional scattering, the diffraction gratings of the first, second and third unit cells display the variable color image recorded in a form of heights of the respective relief structure.

* * * * *